United States Patent
Kim et al.

(10) Patent No.: US 9,578,439 B2
(45) Date of Patent: Feb. 21, 2017

(54) METHOD, SYSTEM AND ARTICLE OF MANUFACTURE FOR PROCESSING SPATIAL AUDIO

(71) Applicant: QUALCOMM Incorporated, San Diego, CA (US)

(72) Inventors: Lae-Hoon Kim, San Diego, CA (US); Raghuveer Peri, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/807,760

(22) Filed: Jul. 23, 2015

(65) Prior Publication Data

US 2016/0198282 A1    Jul. 7, 2016

Related U.S. Application Data

(60) Provisional application No. 62/099,395, filed on Jan. 2, 2015.

(51) Int. Cl.
*H04S 7/00* (2006.01)
*G06F 3/16* (2006.01)
*H04S 3/00* (2006.01)

(52) U.S. Cl.
CPC .............. *H04S 7/30* (2013.01); *G06F 3/165* (2013.01); *H04S 3/002* (2013.01); *H04S 7/301* (2013.01);
(Continued)

(58) Field of Classification Search
None
See application file for complete search history.

(56) References Cited

U.S. PATENT DOCUMENTS

2007/0100482 A1    5/2007  Cotey et al.
2009/0222731 A1    9/2009  Stewart et al.
(Continued)

FOREIGN PATENT DOCUMENTS

WO    2014122550 A1    8/2014
WO    2014184353 A1    11/2014
WO    2014184706 A1    11/2014

OTHER PUBLICATIONS

International Search Report and Written Opinion for International Application No. PCT/US2015/062642, ISA/EPO, Date of Mailing Feb. 25, 2016, 13 pages.

*Primary Examiner* — Paul Huber
(74) *Attorney, Agent, or Firm* — Toler Law Group, PC

(57) ABSTRACT

Techniques for processing directionally-encoded audio to account for spatial characteristics of a listener playback environment are disclosed. The directionally-encoded audio data includes spatial information indicative of one or more directions of sound sources in an audio scene. The audio data is modified based on input data identifying the spatial characteristics of the playback environment. The spatial characteristics may correspond to actual loudspeaker locations in the playback environment. The directionally-encoded audio may also be processed to permit focusing/defocusing on sound sources or particular directions in an audio scene. The disclosed techniques may allow a recorded audio scene to be more accurately reproduced at playback time, regardless of the output loudspeaker setup. Another advantage is that a user may dynamically configure audio data so that it better conforms to the user's particular loudspeaker layouts and/or the user's desired focus on particular subjects or areas in an audio scene.

30 Claims, 17 Drawing Sheets

(52) U.S. Cl.
CPC ........ *H04S 2400/01* (2013.01); *H04S 2400/11* (2013.01); *H04S 2400/15* (2013.01)

(56) References Cited

U.S. PATENT DOCUMENTS

| | | |
|---|---|---|
| 2010/0241959 A1 | 9/2010 | Ng et al. |
| 2010/0316224 A1 | 12/2010 | Lau |
| 2013/0259254 A1 | 10/2013 | Xiang et al. |
| 2013/0342731 A1* | 12/2013 | Lee .................... H04N 5/23293 348/231.4 |
| 2014/0198918 A1 | 7/2014 | Li et al. |

* cited by examiner

METHOD, SYSTEM AND ARTICLE OF MANUFACTURE FOR PROCESSING SPATIAL AUDIO

CLAIM OF PRIORITY UNDER 35 U.S.C. §119

The present application for patent claims priority to Provisional Application No. 62/099,395; entitled "Multi-Channel Sound Reproduction With User Configurable Sound Focus," filed Jan. 2, 2015, and hereby expressly incorporated by reference in its entirety as though set forth fully herein.

TECHNICAL FIELD

The disclosure generally relates to audio systems and, more particularly, to a dynamically configurable multi-channel audio system.

BACKGROUND

Conventional multi-channel recording typically assumes a fixed loudspeaker position in a playback environment; and thus, some conventional multi-channel sound systems process and store audio signals based on standard loudspeaker configurations. Standard multi-channel loudspeaker configurations include conventional L-R stereo, 5.1 surround sound, and 7.1 surround sound, as well as others. However, in a user's acoustic space, e.g., living room, car, or the like, it is not unusual to have loudspeaker positions mismatched from those specified by the standards. Furthermore, if users want to dynamically configure a loudspeaker setup or focus on sound sources or directions, the actual setup and/or user or device selections should be considered for proper audio rendering. For example, if one loudspeaker is non-ideal for some reason such as low battery issue or non-standard location, then an audio playback system should get such information and reflect such differences in real-time for proper audio rendering.

There are some known approaches to create virtual loudspeaker locations to compensate for loudspeaker position mismatch using encoded sound sources, but these approaches may introduce unavoidable sound source location mismatch since some of them attempt to remap the processed output to create virtual loudspeakers.

SUMMARY

To address the foregoing shortcomings, the techniques disclosed herein may process directionally-encoded audio to account for the physical characteristics of a listener playback environment, such as the actual loudspeaker location. The inventive techniques may also process directionally-encoded audio to permit focusing/defocusing on sound from particular direction(s) in an audio scene. An advantage of the disclosed techniques is that a recorded audio scene may be more accurately reproduced at playback time, regardless of the output loudspeaker setup, i.e., the physical configuration and layout of the loudspeakers. Another advantage is that the techniques may permit a user to dynamically configure audio data so that it better conforms to the user's particular loudspeaker layouts and/or the user's desired focus on particular subjects or areas in an audio scene.

In accordance with an aspect of the disclosed techniques, a method of processing audio includes receiving audio data corresponding to a scene. The audio data includes spatial information indicative of one or more directions of one or more sound sources in the scene. The audio data is modified based on input data identifying one or more spatial characteristics of a playback environment.

In accordance with another aspect, a system includes an interface configured to receive audio data corresponding to a scene. The audio data includes spatial information indicative of one or more directions of one or more sound sources in the scene. The system also includes a processor configured to modify the audio data based on input data identifying one or more spatial characteristics of a playback environment.

According to a further aspect, a system includes means for receiving audio data corresponding to a scene, where the audio data includes spatial information indicative of one or more directions of one or more sound sources in the scene; and means for modifying the audio data based on input data identifying one or more spatial characteristics of a playback environment.

According to a further aspect, a computer-readable medium embodying a set of instructions executable by one or more processors stores code for receiving audio data corresponding to a scene, where the audio data includes spatial information indicative of one or more directions of one or more sound sources in the scene. The computer-readable medium also stores code for modifying the audio data based on input data identifying one or more spatial characteristics of a playback environment.

The foregoing summary does not define the limits of the appended claims. Other aspects, features, and advantages will be or will become apparent to one with skill in the art upon examination of the following figures and detailed description. It is intended that all such additional features, aspects, and advantages be included within this description and be protected by the accompanying claims.

BRIEF DESCRIPTION OF DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

Figure 1:
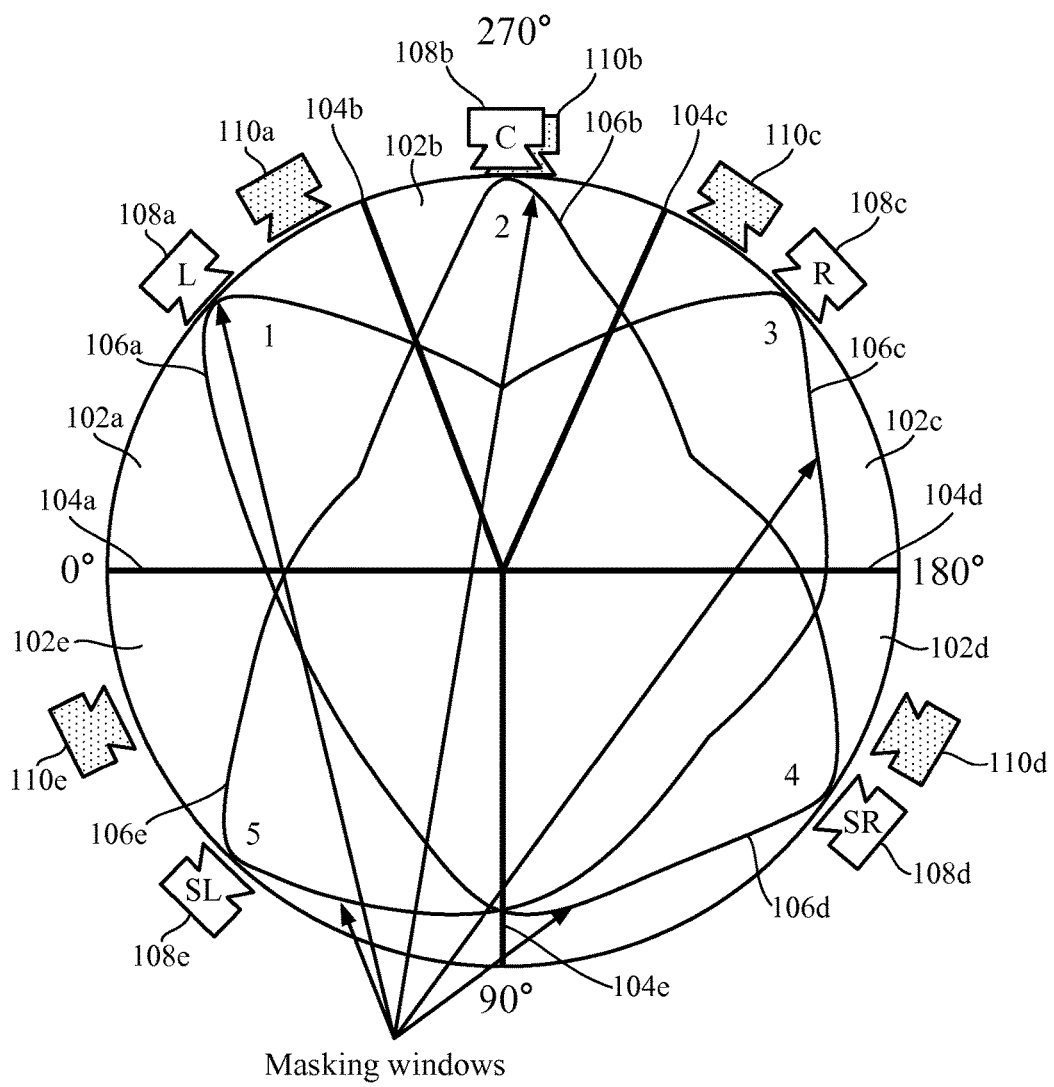
FIG. 1 is a conceptual diagram illustrating an example audio output space where audio masking windows are applied to directionally-encoded audio data to compensate for mismatched loudspeaker locations.

The following detailed description, which references to and incorporates the drawings, describes and illustrates one or more specific examples of audio processing techniques. These techniques, offered not to limit but only to exemplify and teach what is disclosed, are shown and described in sufficient detail to enable those skilled in the art to practice the disclosed techniques. Thus, where appropriate to avoid obscuring the techniques, the description may omit certain information known to those of skill in the art.

The word "exemplary" is used throughout this application to mean "serving as an example, instance, or illustration." Any system, method, device, technique, feature or the like described herein as "exemplary" is not necessarily to be construed as preferred or advantageous over other features.

An advantage of the audio processing techniques disclosed herein is that audio capture can be customized via a graphical user interface (GUI) to account for arbitrary or non-standard loudspeaker layouts. Thus, standard channel-based captured digital audio data can be "shaped" to take into account a non-standard loudspeaker configuration. The spatial impression of sound can be faithfully reproduced regardless of the loudspeaker offset from a recommended, standard location. Prior to this innovation, no such flexibility and robustness existed for custom audio capture and/or playback. Known audio capture and/or playback was for fixed standard loudspeaker positions, e.g., surround sound 5.1, surround sound 7.1, stereo, mono, or the like.

Users may want to reproduce a recorded audio scene as similar as possible at playback time, regardless of their output loudspeaker setups, i.e., the physical configuration and layout of the loudspeakers. The disclosed audio processing techniques permit users to dynamically configure the audio data so that they are better conformed to the users' particular loudspeaker layouts, respectively.

Additionally, the disclosed audio processing techniques afford the capability of focusing/defocusing on sound from particular direction(s), in conjunction with a transparent directional audio scene reproduction. The disclosed audio processing techniques can provide a transparent match between recorded sounds source(s) and reproduced source location(s) within, for example, the context of pair-wise/vector-based amplitude panning. Thus, the disclosed techniques provide a user adjustable sound focus/defocus capability while maintaining the directional perception of sounds within the reproduced audio scene.

The disclosed techniques can also dynamically perform positional sound encoding at playback/rendering time so that a sound system can achieve reciprocity based on the actual location and number of loudspeakers available, based on a priori location information about such loudspeakers.

The audio processing techniques are described herein with reference to two-dimensional audio spaces (scenes). However, the disclosed techniques can be extended to three-dimensional audio scenes by adding one or more microphones (for the capture process) and loudspeakers (for playback) in the z-axis.

FIG. 1 is a conceptual diagram illustrating an example audio output space 100 (output scene) representing a playback environment in which audio is played back to one or more listeners. In the example shown, five output audio channels are used, with audio being played back on actual loudspeakers 108a-e. The exemplary configuration is a surround sound system 5.1, with loudspeaker 108a corresponding to the left (L) channel, loudspeaker 108b corresponding to the center (C) channel, loudspeaker 108c corresponding to the right (R) channel, loudspeaker 108d corresponding to the surround right (SR) channel, loudspeaker 108e corresponding to the surround left (SL) channel. However, as shown in FIG. 1 the actual locations of the user's real loudspeakers 108a-e are offset from the standard loudspeaker locations 110a-e. In the example, the standard loudspeaker locations 110a-e correspond to those specified by surround sound 5.1.

As conceptually illustrated, audio masking windows 106a-e are applied by a sound system (not shown in FIG. 1) to directionally-encoded audio data to compensate for the mismatched loudspeaker locations. To accomplish masking, the audio space 100 is divided into five user-configurable sectors 102a-e. The sectors 102a-e are delineated by sector boundaries 104a-e. The boundary locations may be user-defined, as further described below in connection with FIGS. 4 and 10-11. Thus, a user may define the region of each sector by defining its boundaries. Although any suitable method or measurements may be used to define the boundaries and sectors, for purposes of illustration, the boundaries may be defined as a radial lines emanating from the center of the space, with a unit circle angle defining the location of each of the boundaries 104a-e. For example, the boundaries 104a, 104e of Sector 5 106e are located at 0 and 90 degrees, respectively. The boundaries and sectors are examples of data or information that may be used to describe the spatial characteristics of the playback environment.

Each sector 102a-e may correspond to the actual location of a respective loudspeaker 108a-e. In some circumstances, the loudspeakers may be centered between the boundaries within their respective sector.

The audio processing technique described here may be applied to an audio space having any suitable number of sectors, and the sectors can vary in size and shape, and their size or shape may or may not be uniform.

The masking windows 106a-e may be gain functions that are applied to directionally-encoded input audio data to "shape" the output audio according to the loudspeaker configuration of the playback audio space 100. Each masking window function may use frequency bin based masking and time-frequency domain smoothing.

For each captured audio frame, the direction of arrival (DOA) is estimated per frequency bin, resulting in a directional-encoded audio frame. The directional information (DOA) of each frame may be retained along with other audio information describing the frame, such as spectrum information. Techniques for estimating the DOA of input audio are described below in connection with FIGS. 12-15. Based on the estimated DOA of the input audio, a masking window gain for each output channel 108a-e is computed. Generalizing, M masking gains (corresponding to M audio output channels) are computed for each audio frame, where M is an integer.

In the example audio space 100 of FIG. 1, M=5, and thus, five masking gains are computed for each frame of audio. By way of further example, consider M=2, which may be an audio space representing stereo output. Hence, for each audio frame, based on the DOA per each frequency bin, two masking gains are computed, one for the left channel and other for the right channel. Although two and five channel audio scenes are depicted in this disclosure, the audio processing techniques described herein are applicable to scenes having any suitable number of channels, M.

Figure 2:
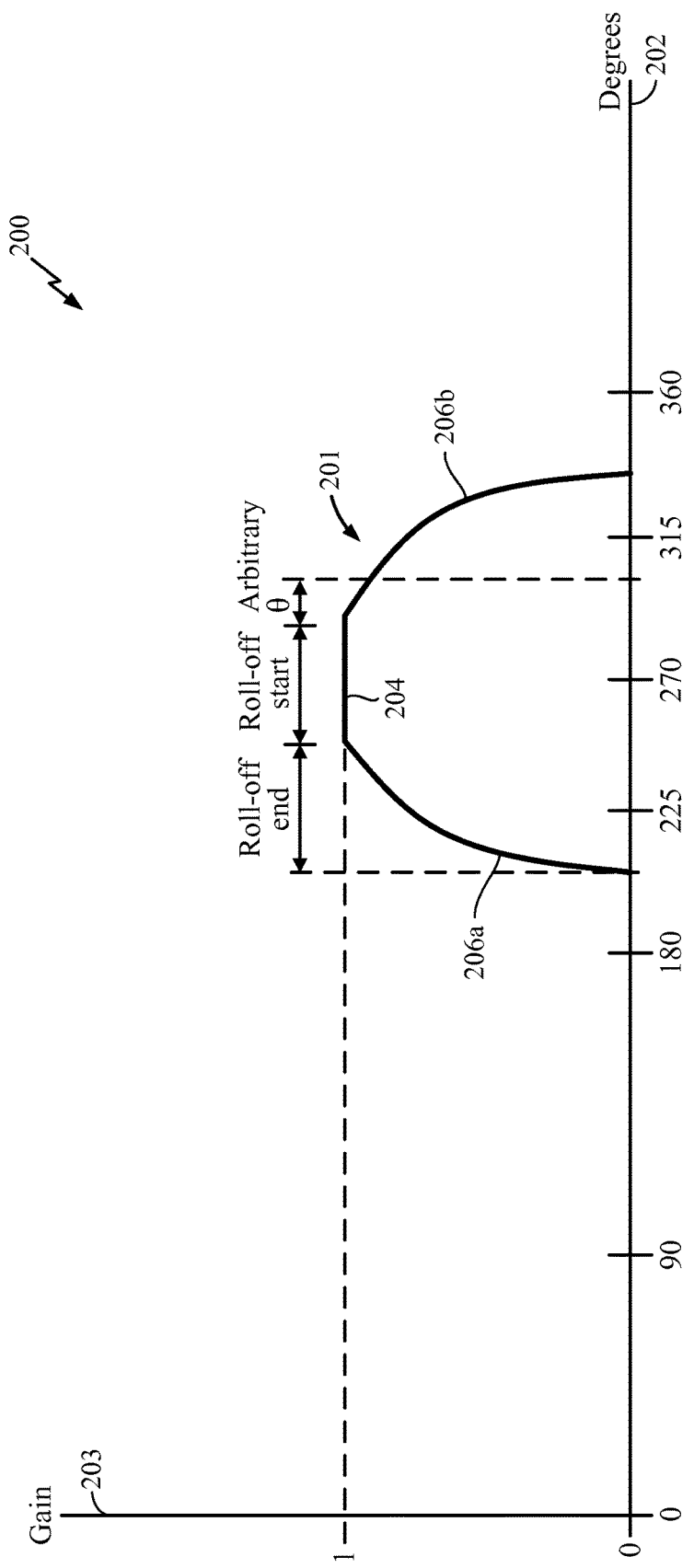
FIG. 2 is a graph illustrating an exemplary masking window function.

FIG. 2 is a graph 200 illustrating an exemplary masking window function 201. The masking window function 201 is a piecewise-cosine function. The graph x-axis 202 represents a DOA, and the graph y-axis 203 represents the gain. In the example shown, the gain varies between zero and one (unity).

The example function 201 illustrates the case where only one audio sector is enabled, and the sector boundaries are 225 and 315 degrees. The masking window is designed with the center of the sector (270 degree) having a unity gain. Moving away from the center, the gain can be maintained as unity 204 until the "roll-off start" angle, which is a degree value that is a tuning parameter.

The end of the masking function has zero gain. The location of these ends can be tuned by using the "Roll-off end" angle.

The portion of the window between the unity and zero gains may be a piecewise cosine function refer to as 206a-b in FIG. 2. In order to calculate an audio output with gain applied at an estimated DOA angle θ (in degrees) of an audio frame, the following generalized function may be used:

$$\text{Gain} = \cos\left(\theta \cdot \frac{90}{\text{Roll-off end}}\right) p_2, \quad \text{(Eq. 1)}$$

where Gain is the masking window function output (audio output signal), Roll-off end equals the number of degrees in the Roll-off end (see, e.g., FIG. 2) between zero and unity gain, and $p_2$ is the amplitude of the input audio signal represented by the frame.

Referring to FIG. 1, the masking window functions can be configured so that the gain at each actual loudspeaker position 108a-e is unity and at each sector boundary 104a-e, the gain is 1/sqrt(2) to ensure smooth audio transitions at the boundaries. The gains at the boundaries are tunable.

Other suitable masking window functions may be used, including those based on the pairwise panning rule, as described immediately below.

For the pairwise panning rule, the sine law for panning is generally followed.

For example, referring to FIG. 1, between the left channel 108a and the center channel 108b, there is a 30 degree angle distance, and measuring the sound source DOA angle θ from the left loudspeaker position yields:

$$\text{Left}_2 = \cos\left(\theta \cdot \frac{90}{30}\right) p_2 \quad \text{(Eq. 2)}$$

$$\text{Center}_2 = \sin\left(\theta \cdot \frac{90}{30}\right) p_2, \quad \text{(Eq. 3)}$$

where $\text{Left}_2$ is the output of the left channel loudspeaker 108a and $\text{Center}_2$ is the output of the center channel speaker 108b, and $p_2$ is the input audio amplitude.

Similar computations may be performed for each pair of loudspeakers using respective angle distances and DOA angles. Once such calculations per each pair are done, they are summed together to obtain the final output per channel. For example, for the left speaker 108a of FIG. 1, the following computation can be performed:

$$\text{Left}_{final} = \sum_{i=1}^{N} \text{Left}_i, \quad \text{(Eq. 4)}$$

where N equals the number of speaker pairs and $\text{Left}_{final}$ is the left channel output.

The distance mismatch from the listener to each loudspeaker may also be accounted for by introducing one more gain factor per channel depending on the straight line distance between the listener and the particular loudspeak.

For example, to account for the actual distance between the listener and the left channel speaker 108a of FIG. 1, the follow equations may be used:

$$\text{Left}_{final} = \text{gain}_{Left} \cdot \text{Left}_{final} \quad \text{(Eq. 5)}$$

$$\text{gain}_{Left} = \frac{\text{Distance}_{Left}}{\text{Distance}_{Max}}, \quad \text{(Eq. 6)}$$

where $\text{Distance}_{Max}$ may be the standard, expected distance between the listener and the loudspeaker 108a, and $\text{Distance}_{Left}$ is the actual distance between the listener and the loudspeaker 108a. In the example space 100 of FIG. 100, the listener may be located in the center of the diagram.

A vector based panning rule, such as that described in U.S. patent application Ser. No. 13/831,515, entitled "Collaborative Sound System," filed Mar. 14, 2013 may alternatively be used for the masking windows.

Figure 3:
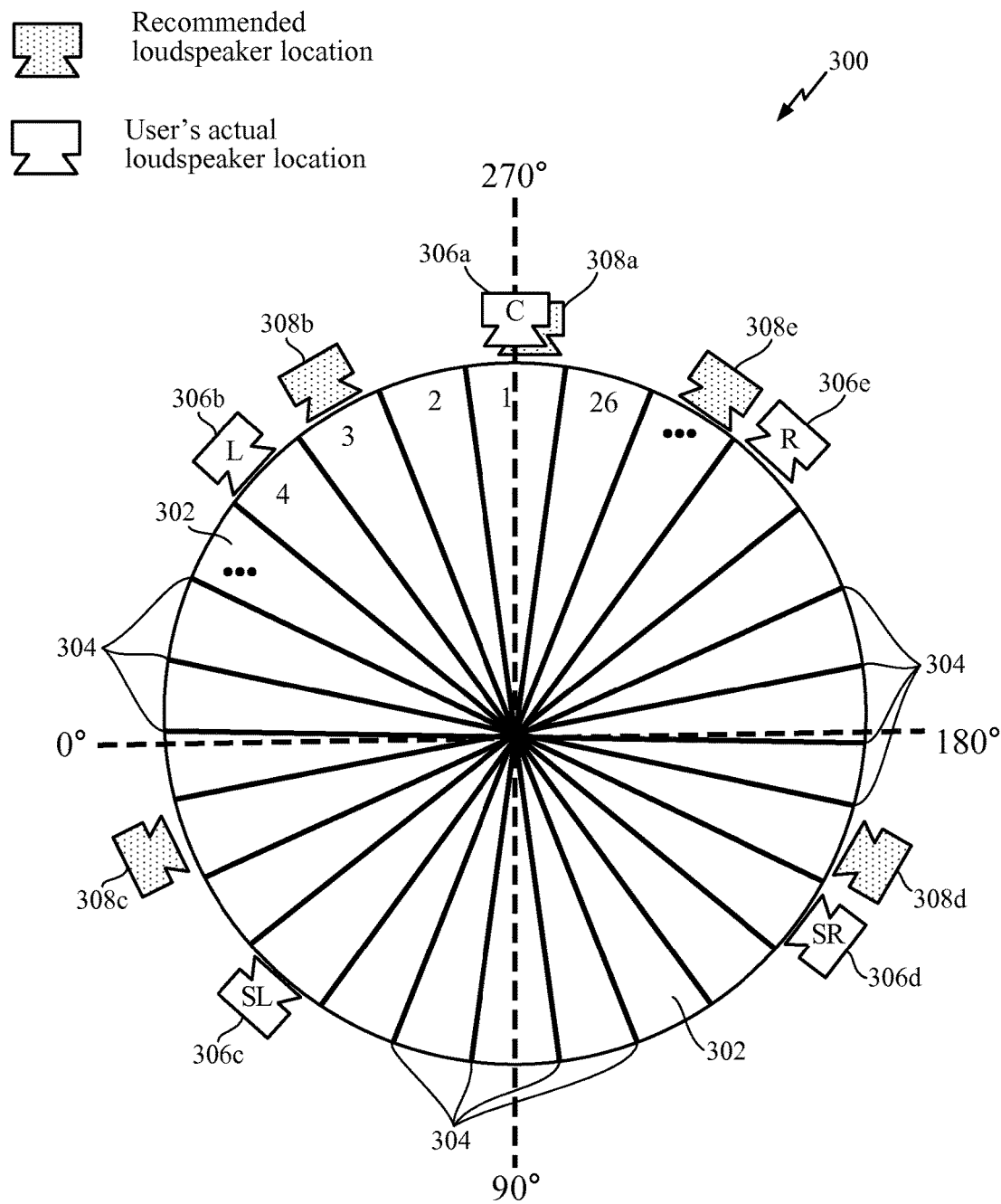
FIG. 3 is a conceptual diagram illustrating another example audio output space divided into 26 sectors.

FIG. 3 is a conceptual diagram illustrating a second example audio output space 300 divided into 26 sectors. In this case, the number of sectors, N, equals 26. The audio space 300 is represented by 26 equally-sized sectors 302 demarcated by boundaries 304. In the output scene 300, audio is played back by actual loudspeakers 306a-e, each outputting a respective channel of surround sound 5.1. The locations of the loudspeakers 306a-e may be mismatched, as shown, with the recommended loudspeaker locations 308a-e for surround sound 5.1

Audio from an input audio scene may be recorded and then post-processed as described above in connection with FIGS. 1-2 into multi-channel audio output (five channels in the example of FIG. 3), with respect to the actual loudspeaker positions 306a-e. For example, an audio frame with a DOA in Sector 1 is assigned to the center channel, which is output by loudspeaker 306a. An audio frame with a DOA in Sector 2 is assigned to the center and left channels 306a, 306b depending on the employed panning rule or masking window function, and based on the DOA angle of the dominant sound source in Sector 2. Audio frames with a DOA occurring in Sector 3 are assigned to the center and left channels 306a, 306b depending on the employed panning rule or masking window function, and based on the DOA angle of the dominant sound source in Sector 3. Audio frames with an estimated DOA in sector 4 is assigned to the left channel 306b, and so forth.

With an arbitrary number of sectors, N, the processing technique can handle any number of loudspeakers, M, where M≤N, without loss of generality.

The sectors 302 need not have equal angle distance and size, as depicted in FIG. 3.

Figure 4:
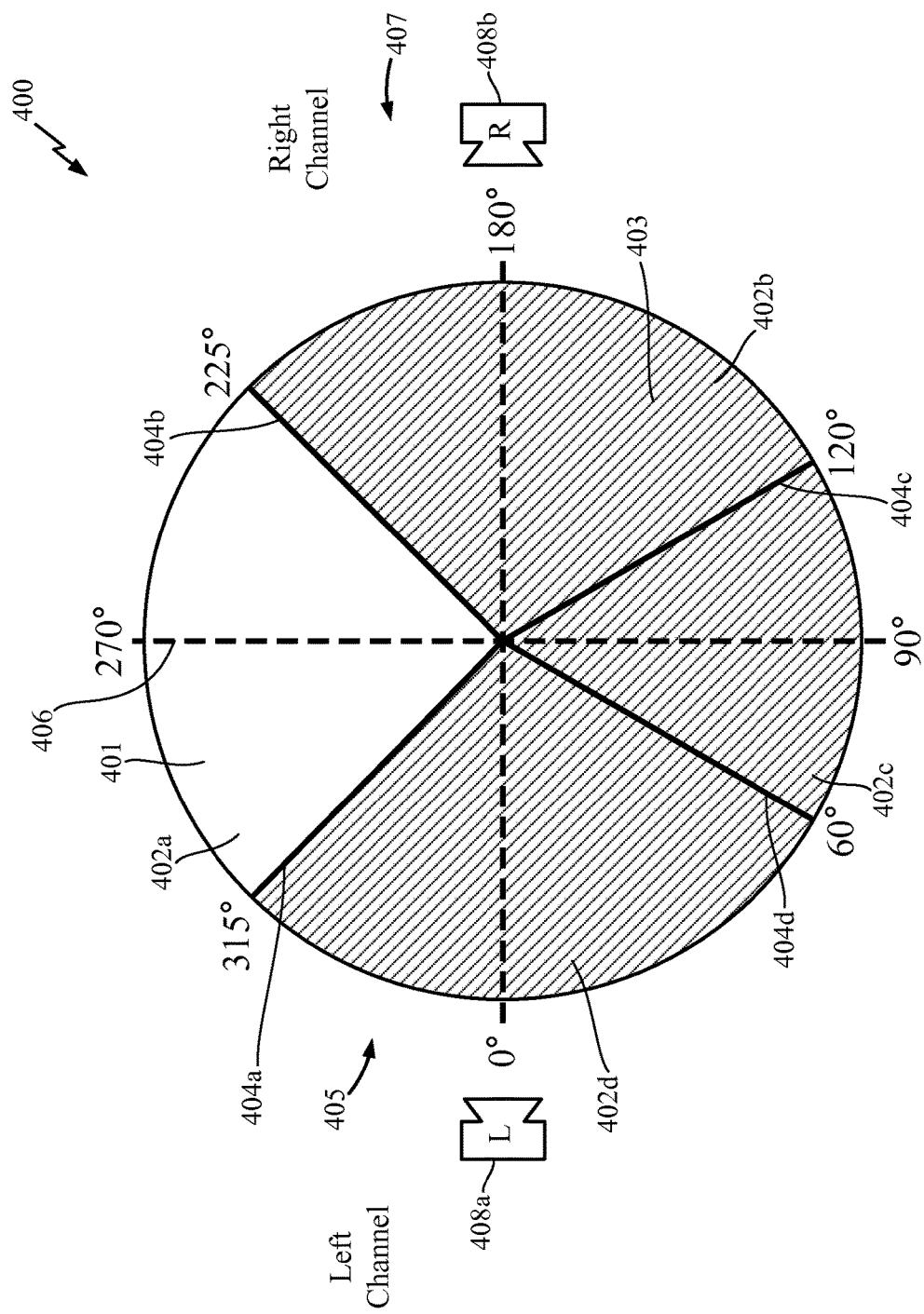
FIG. 4 is a conceptual diagram illustrating an example audio output space where a region of the audio space is enabled by a user and other regions of the audio space are disabled.

FIG. 4 is a conceptual diagram illustrating an example audio output space 400 where a region 401 of the audio space 400 is enabled by a user and other regions 403 of the audio space 400 are disabled. In this example, the directionally-encoded audio is not only shaped by the masking window functions or a panning rule (as illustrated in FIGS. 1-3) depending on the DOA of the audio, but it is further shaped based on user-selected regions of the audio space 400. This permits users to focus audio playback on desired region(s) in an audio space.

The regions can correspond to areas and directions in an audio scene having sound sources located therein and subject to being recorded by an audio system.

The example audio space 400 depicts a scene with two channel sectors, a left channel sector 405 and a right channel sector 407, having a sector boundary 406 conceptually running between 90 and 270 degrees to divide the sectors 405, 407. A left loudspeaker 408a provides left channel audio output, and a right loudspeaker 408b provide left channel audio output. This channel arrangement may represent stereo output.

There are four user-selectable regions 402a-d separated by boundaries 404a-d. The number, boundary locations, and sizes of the user-selectable regions 402a-d may be configured by a user through a graphic user interface (GUI) that may display an audio scene in a unit-circle fashion, such as illustrated in FIGS. 1, 2 and 4. As shown in the example, a first selectable region 402a extends between 225° and 315°; a second selectable region extends 402b between 120° and 225°; a third selectable region 402c extends between 60° and 120°; and a fourth selectable region 402d extends between 315° and 60°. Any suitable number of channel sectors and user-selectable regions may be used.

The example space 400 shows a first region 402a being selected (enabled), and the other three regions 402b-d being disabled.

To accomplish the audio processing depicted in FIG. 4, two types of parameters are input by a user through the GUI. These parameters are:
 Sector Boundaries and Region Boundaries—These may be entered angles in degrees of the unit circle where the sector boundaries and region boundaries are located. These can be changed in real-time by the user during audio recording or during audio playback.
 Region Enablement—Information about whether a particular region is enabled or not. The user can select or unselect a region in real-time during recording or during playback.

Based on the region enablement information from the GUI, masking windows are generated for each of the enabled sectors. Determining which sectors or portions thereof are enabled entails mapping enabled regions to the sectors. This depends on the sector boundaries and region boundaries. Given a user configuration from the GUI, a decision whether the enabled region belongs to certain a channel sector or a combination of them may be made according to the following method. The method is illustrated with reference to the audio space 400 of FIG. 4. Thus, as discussed below, the method decides whether the enabled region 401 belongs to the left channel sector 405, the right channel sector 407, or a combination of the two.

The exemplary method proceeds as follows. The region enablement information is first converted into 0's and 1's for each angle in steps of one degree. For example, consider the case where only the top region 401 of FIG. 4 is enabled with the sector boundary 406 configuration as shown in FIG. 4. A 360-by-1 matrix is generated as follows:
 if the angle is part of an enabled region, matrix at that angle=1
 if not, matrix at that angle=0.

This way, a 360-by-1 matrix of 0's and 1's is generated based on enabled region information. The matrix may be stored in an audio processing system and used by one or more software programs for performing the method.

Then, for each channel sector 405, 407, the start and end points of the masking window need to be obtained. To do this for the right channel sector 407, the method searches the matrix starting from the 90 degree boundary and incrementing up by one degree, until it hits the first 1 stored in the matrix. In the example space 400, the first 1 is found in the matrix at an angle of 225 degrees. The method considers this as the beginning point of the masking window for the right channel sector. Next, the method continue to sequentially search the matrix for a 0 until it reaches the second sector boundary at the angle of 270 degrees, which is the right channel sector boundary. The angle at which the first 0 occurs is considered as the end of masking window for right channel. If a 0 does not occur in the matrix until after the 270 degree boundary, then the starting point of left channel sector (315 degrees in this case) is considered as the end point of the right channel sector masking window.

In a similar fashion, the start and end points for the left channel masking window are performed. The sequential matrix search for the left channel sector may be performed for the first hit of 1 and first hit of zero, starting from sector boundary at 270 degrees, anti-clockwise until reaching the 90 degree boundary.

If the enabled region 401 shares a sector boundary, as it does in FIG. 4, the method treats the connected sectors as one sector. In this case the outmost enabled region boundaries becomes the sector boundaries. Thus, according to the method, sector boundaries may overlap in some circumstance. For example, in the audio output scene 400 of FIG. 4, for purposes of computing the left channel masking window, the left channel sector boundary is extended to 225 degrees instead of 270 degrees. Conversely, for purposes of computing the right channel masking window, the right channel sector boundary is extended to 315 degrees instead of 270 degrees.

Next, having determined the sector boundaries, the gain per frame per frequency bin is computed using a masking window, as discussed above in connection with FIGS. 1-3. In the example audio space of FIG. 4, a left channel masking function centered at zero degrees may be computed for audio frames having a DOA, θ, between 225° and 315°; and a right channel masking function centered at 180 degrees may be computed for audio frames having an associated DOA, θ, between 225° and 315°.

Figure 5:
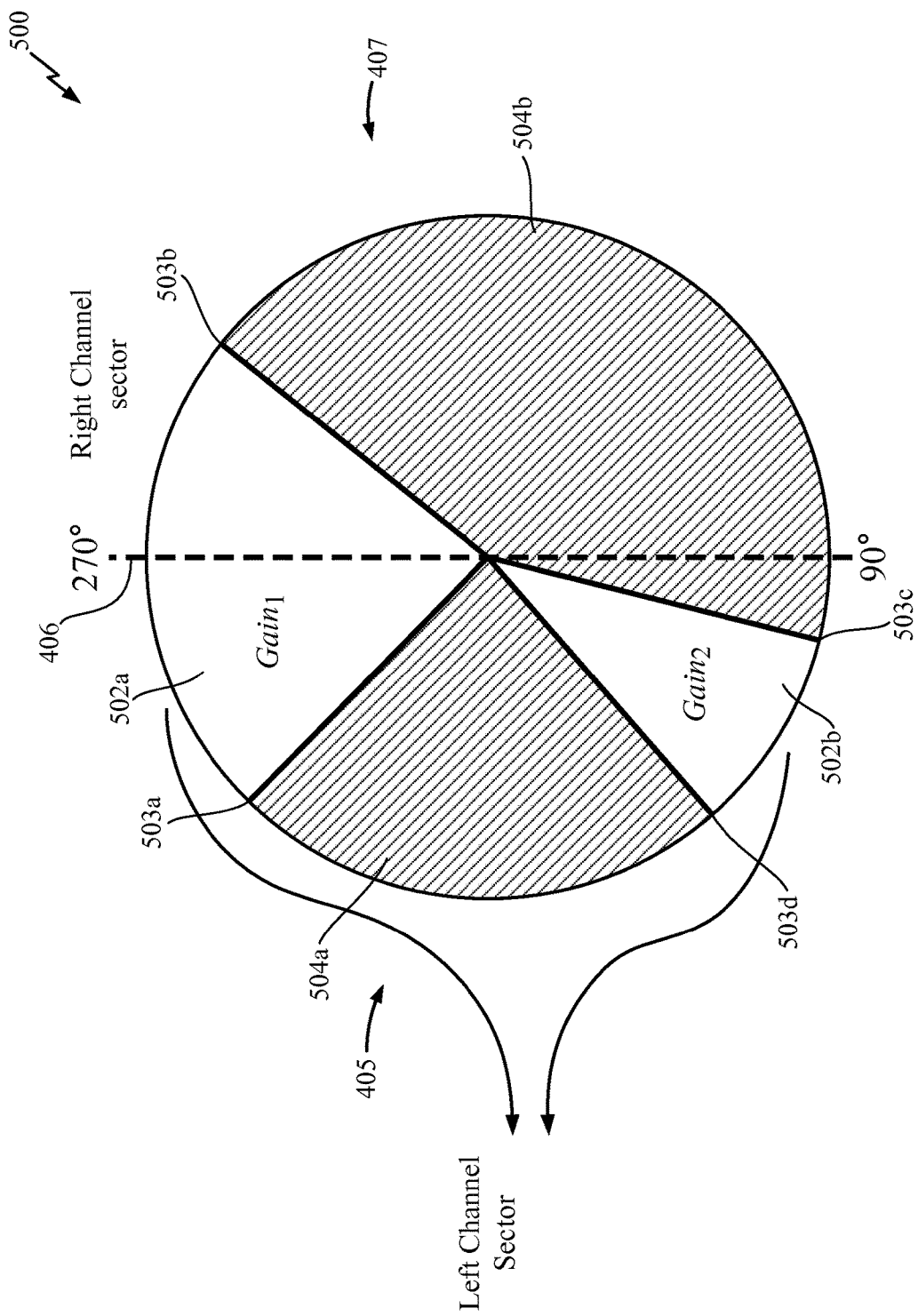
FIG. 5 is a conceptual diagram illustrating an example audio output space where a two regions of the audio space are enabled by a user and other regions of the audio space are disabled.

FIG. 5 is a conceptual diagram illustrating an example audio output space 500 where two disjoint regions 502a, 502b of the audio space 500 are enabled by a user and other regions 504a, 504b of the audio space are disabled. The user-enabled regions are defined by boundaries 503a-d. Here there are two user-enabled regions 502a, 502b belonging to left channel sector 405 and one region 502a belonging to right channel sector 407. A GUI may be used to enter information concerning the region and sector boundaries and the region enablement, as described in connection with FIG. 4. The matrix search method described above in connection with FIG. 4 may be used to determine the start and end points of both the left channel and right channel masking windows.

In this case, the right channel masking window is generated as discussed above in connection with FIG. 4. For the left channel, two masking windows are generated, one for each enabled regions 502a-b. The cumulative masking window gain applied for the left channel is then computed as, $$Gain_{Left} = Gain_1 + Gain_2 \quad (Eq. 7)$$

$Gain_1$—Gain according to the first enabled region 502a, as computed using the left channel masking window function.

$Gain_2$—Gain according to the second enabled region 502b, as computed using the left channel masking window function.

In this scenario, for any given DOA, either one or both of the two left channel gains is always zero.

The above description for FIGS. 4 and 5 assume a stereo output. However, the audio processing techniques depicted in these Figures may be applied for M output channels (e.g., sectors), for example a five or seven channel surround sound output can be generated according to techniques similar to those discussed above. The difference being, instead of computing two masking window gains, one each for the left and right channels, five or seven masking window gains are computed, one for each of the corresponding channels.

Figure 6A:
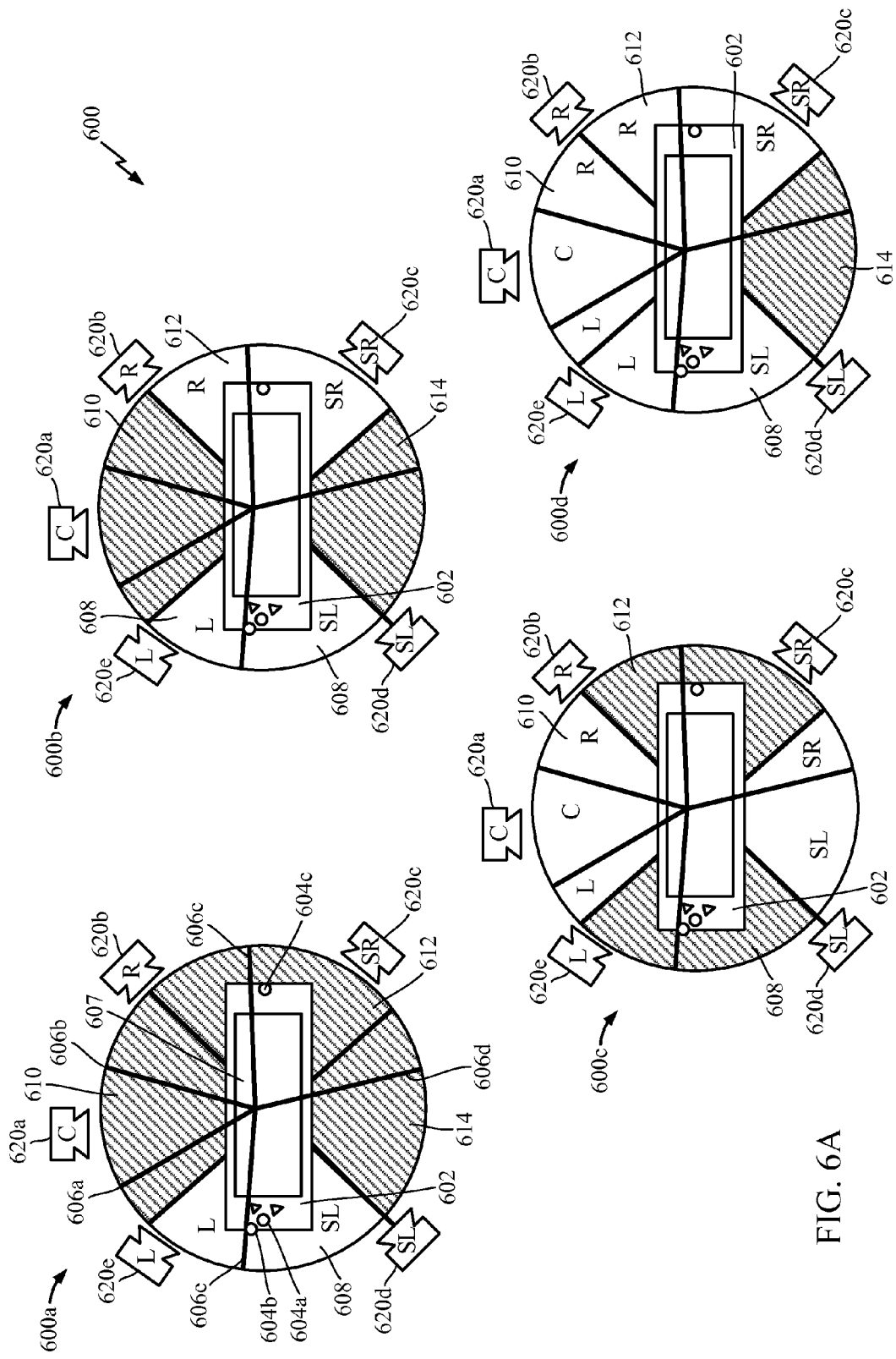
FIGS. 6A-B are conceptual diagrams illustrating an example multi-channel audio space during different operational scenarios where various audio scene regions are selectively enabled or disabled by a user.
Figure 6B:
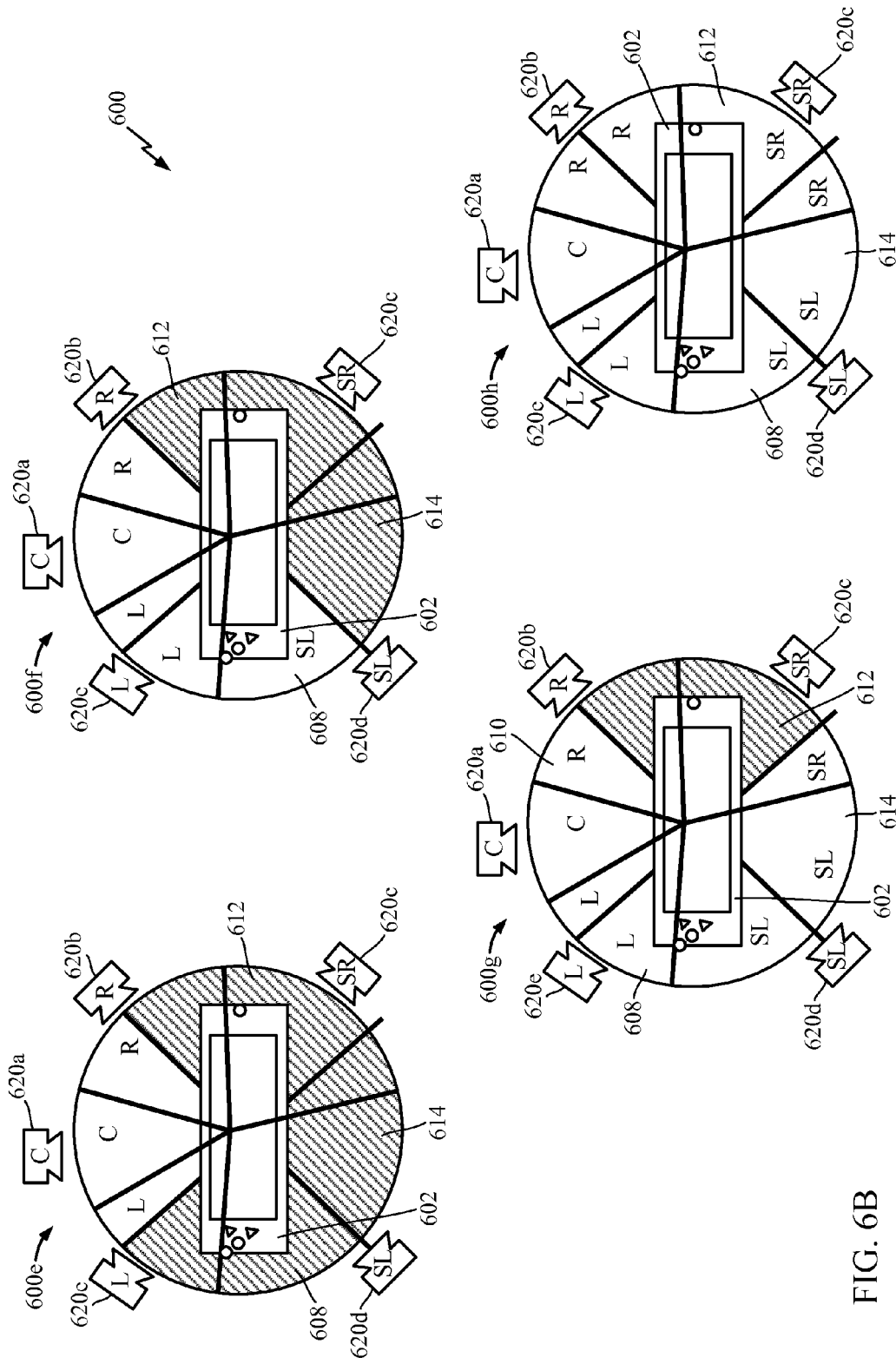

FIGS. 6A-B are conceptual diagrams illustrating an example multi-channel audio scene space 600 during eight different operational scenarios 600a-h where various regions 608, 610, 612, 614 are selectively enabled or disabled by a user. Centered within the space 600 is a device 602 for recording and processing audio according to the methods described herein. The device may be a handheld device such as cellular phone or smart phone having a screen 607 for displaying a GUI and multiple microphones 604a-c. The GUI may be used by a user to input information regarding sectors, sector boundaries, regions, region boundaries, and region enablement selections.

In the examples depicted by FIGS. 6A-B, the device 602 may divide the audio scene 600 according to configurations set by a user of the device 602. In the example shown, the audio scene 600 is divided into five channel sectors as indicated by sector boundaries 606a-e. The sector configuration corresponds to a five channel surround sound system have a center (C) channel loudspeaker 620a, a right (R) channel loudspeaker 620b, a surround right (SR) channel loudspeaker 620c, a surround left (SL) channel loudspeaker 620d, a left (L) channel loudspeaker 620e. Other sector (loudspeaker) configurations, such as a seven channel output, can be used.

The user-enabled regions (focused areas) are processed with one or more masking window functions, in accordance with the techniques described in connection with FIGS. 1-5 and 10-11. Each of the masking windows may give a unity gain on the location of the corresponding sector loudspeaker and may give proper roll off (such as the piecewise cosine function of FIG. 2) to suppress the sounds coming from the disabled regions or the directions belonging to other loudspeaker channel sectors.

In the first operational scenario 600a, a left region 608 (shaded dark) is enabled for audio capture/playback, and the other regions 610-614 (line shaded) are disabled. The enable/disable selection can be accomplished, for example, by a user via a GUI input, as described in reference to FIG. 4. The method described in connection with FIG. 4 may be used to determine the starting and ending points of the masking window functions to be applied to recorded audio in this scenario. The masking windows may then be applied to the audio as described in connection with FIGS. 1-3. In this manner, sound sources located in the enabled region 608 are focused, while the sound sources in the disabled regions are suppressed.

In the second operational scenario 600b, the left region 608 and a right region 612 (both shaded dark) are enabled for audio capture/playback, and the other regions 610, 614 (line shaded) are disabled. The enable/disable selection can be accomplished, for example, by a user via a GUI input, as described in reference to FIG. 4. The method described in connection with FIG. 4 may be used to determine the starting and ending points of the masking window functions to be applied to recorded audio in this scenario. The masking windows may then be applied to the audio as described in connection with FIGS. 1-3. In this manner, sound sources located in the enabled regions 608, 612 are focused, while the sound source in the disabled regions 610, 614 are suppressed.

In the third operational scenario 600c, a top region 610 and a bottom region 614 (shaded dark) are enabled for audio capture/playback, and the other regions 608, 612 (line shaded) are disabled. The enable/disable selection can be accomplished, for example, by a user via a GUI input, as described in reference to FIG. 4. The methods described in connection with FIGS. 4-5 may be used to determine the starting and ending points of the masking window functions to be applied to recorded audio in this scenario. The masking windows may then be applied to the audio as described in connection with FIGS. 1-3. In this manner, sound sources located in the enabled regions 610, 614 are focused, while the sound sources in the disabled regions 608, 612 are suppressed.

In the fourth operational scenario 600d, the left, top and right regions 608, 610, 612 (shaded dark) are enabled for audio capture/playback, and the remaining region 614 (line shaded) is disabled. The enable/disable selection can be accomplished, for example, by a user via a GUI input, as described in reference to FIG. 4. The method described in connection with FIG. 4 may be used to determine the starting and ending points of the masking window functions to be applied to recorded audio in this scenario. The masking windows may then be applied to the audio as described in connection with FIGS. 1-3. In this manner, sound sources located in the enabled regions 608-612 are focused, while the sound sources in the disabled region 614 are suppressed.

The remaining operational scenarios 600e-h of FIG. 6B are to be similarly understood as the previously described scenarios 600a-d, with solid shaded regions depicting enabled regions and line shaded regions depicting disable regions.

Figure 7A:
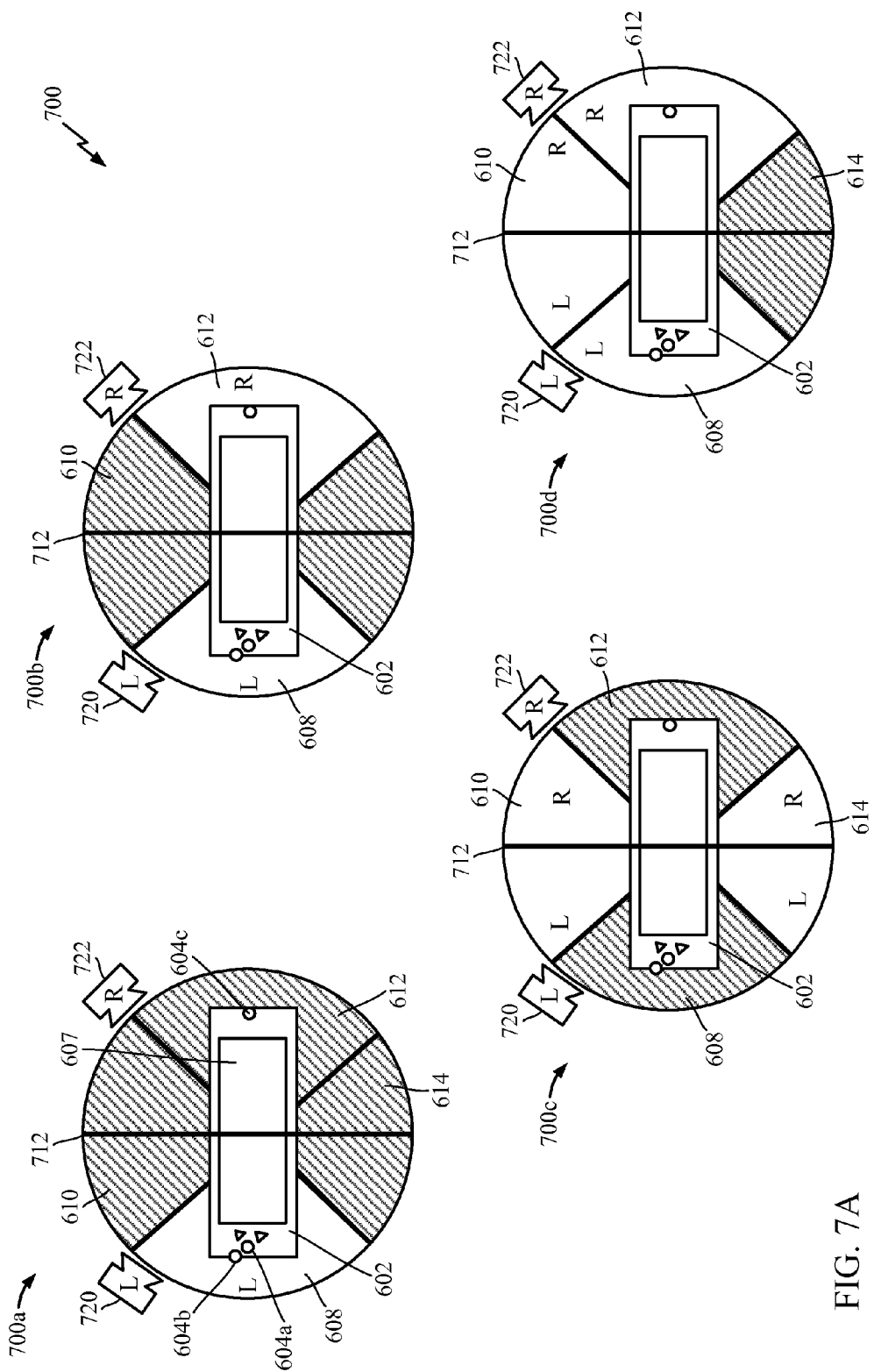
FIGS. 7A-B are conceptual diagrams illustrating an example stereo audio space during different operational scenarios where various audio scene regions are selectively enabled or disabled by a user.
Figure 7B:
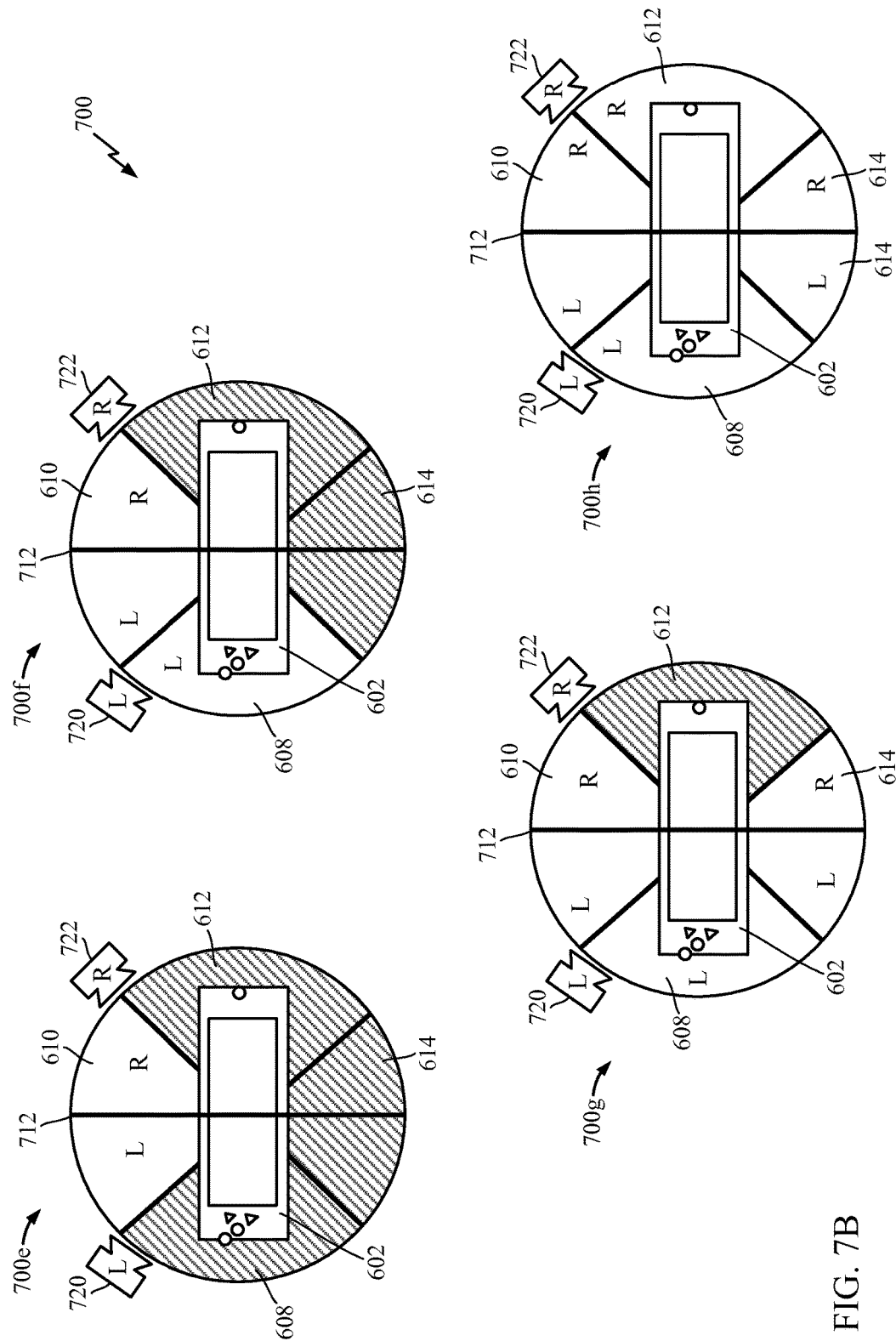

FIGS. 7A-B are conceptual diagrams illustrating an example stereo audio scene space 700 during eight different operational scenarios 700*a-h* where various regions 608-614 are selectively enabled or disabled by a user. Centered within the space 700 is the device 602 for recording and processing audio according to the methods described herein. The device GUI may be used by a user to input information regarding sectors, sector boundaries, regions, region boundary, and region enablement selections.

In the examples depicted by FIG. 7, the device 602 divides the audio space 700 into two channel sectors (stereo output) as indicated by sector boundary 712, according to user boundary selections configured through the device GUI. The sectors correspond to a left (L) channel loudspeaker 720 and a right (R) channel loudspeaker 722, respectively.

The user-enabled regions (focused areas) are processed with one or more masking windows, in accordance with the techniques described in connection with FIGS. 1-4 and 10-11. Each of the masking windows may give a unity gain on the location of the corresponding sector loudspeaker and can give proper roll off (such as the piecewise cosine function of FIG. 2) to suppress the sounds coming from the disabled regions or the directions belonging to other loudspeaker channel sectors.

In the first operational scenario 700*a*, the left region 608 (shaded dark) is enabled for audio capture/playback, and the other regions 610-614 (line shaded) are disabled. The enable/disable selection can be accomplished, for example, by a user via a GUI input, as described in reference to FIG. 4. The method described in connection with FIG. 4 may be used to determine the starting and ending points of the masking window functions to be applied to recorded audio in this scenario. The masking windows may then be applied to the audio as described in connection with FIGS. 1-3. In this manner, sound sources located in the enabled region 608 are focused, while those sound sources in the disabled regions 610-614 are suppressed.

In the second operational scenario 700*b*, the left region 608 and the right region 612 (shaded dark) are enabled for audio capture/playback, and the other regions 610, 614 (line shaded) are disabled. The enable/disable selection can be accomplished, for example, by a user via a GUI input, as described in reference to FIG. 4. The method described in connection with FIG. 4 may be used to determine the starting and ending points of the masking window functions to be applied to recorded audio in this scenario. The masking windows may then be applied to the audio as described in connection with FIGS. 1-3. In this manner, sound sources located in the enabled regions 608, 612 are focused, while the sound source in the disabled regions 610, 614 are suppressed.

In the third operational scenario 700*c*, the top region 610 and the bottom region 614 (shaded dark) are enabled for audio capture/playback, and the other regions 608, 612 (line shaded) are disabled. The enable/disable selection can be accomplished, for example, by a user via a GUI input, as described in reference to FIG. 4. The methods described in connection with FIGS. 4-5 may be used to determine the starting and ending points of the masking window functions to be applied to recorded audio in this scenario. The masking windows may then be applied to the audio as described in connection with FIGS. 1-3. In this manner, sound sources located in the enabled regions 610, 614 are focused, while the sound sources in the disabled regions 608, 612 are suppressed.

In the fourth operational scenario 700*d*, the left, top and right regions 608, 610, 612 (shaded dark) are enabled for audio capture/playback, and the remaining region 614 (line shaded) is disabled. The enable/disable selection can be accomplished, for example, by a user via a GUI input, as described in reference to FIG. 4. The method described in connection with FIG. 4 may be used to determine the starting and ending points of the masking window functions to be applied to recorded audio in this scenario. The masking windows may then be applied to the audio as described in connection with FIGS. 1-3. In this manner, sound sources located in the enabled regions 608-612 are focused, while the sound sources in the disabled region 614 are suppressed.

The remaining operational scenarios 700*e-h* of FIG. 7B are to be similarly understood as the previously described scenarios 700*a-d*, with solid shaded regions depicting enabled regions and line shaded regions depicting disable regions.

Improved scene reproduction in terms of preserving localization cue may be possible with binaural down-mixing additionally being used by the device 602 shown in the scene 700 of FIG. 7.

The methods described above may be extended to binaural down-mixing provided that a database for a binaural impulse response is dense enough to sample 360 degrees around the device 602. Since the techniques disclosed herein can generate multi-channel audio output for any kind of loudspeaker setup, such audio output may be used as input to the binaural down-mixing. The corresponding binaural response each at designated loudspeaker position is computed by the down-mixing.

Figure 8:
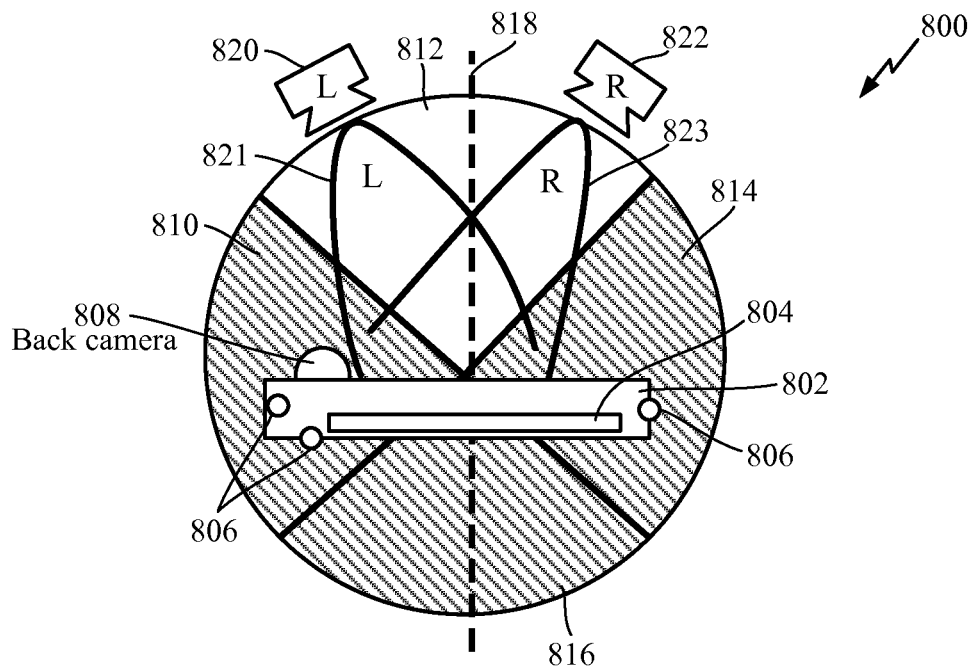
FIG. 8 is a conceptual diagram illustrating an example audio scene space around a handheld device where the audio region corresponding to a back camera of the handheld device is enabled.

FIG. 8 is a conceptual diagram illustrating an example audio scene 800 around a handheld device 802 where the audio region corresponding to a back camera 808 of the handheld device 802 is enabled. The device 802 may be a cellular phone or smart phone, or any other mobile device. In this example, the device 802 acts as an audio capture device that records directional encoding of audio for stereo output. The directional encoding is based on the camera operation.

The device 802 includes multiple microphones 806 for capturing audio in the scene and a display screen 804 for displaying a GUI that is configured to allow a user to operate the camera 808, including camera features such as a zoom function. The camera 808 may be a still or video camera.

In the scene 800, a boundary 818 defines a left channel sector having a left (L) channel loudspeaker 820 and right channel sector having a right (R) channel loudspeaker 822. During audio capture/playback the device 802 applies masking window functions 821, 823 as described in connection with FIGS. 1-3. The selectable regions 810, 812, 814 and 816 may be either enabled or disabled depending on operation of the camera 808. In the example shown, when the camera 808 is activated the top region 812 is enabled (solid shading), while the other regions 810, 814, and 816 are disabled (line shading). This focuses the audio recording on the scene in front of the camera and suppresses sound in the other regions. The method described in connection with FIG. 4 can be used to map the enabled region to the left and right channel sectors.

Figure 9:
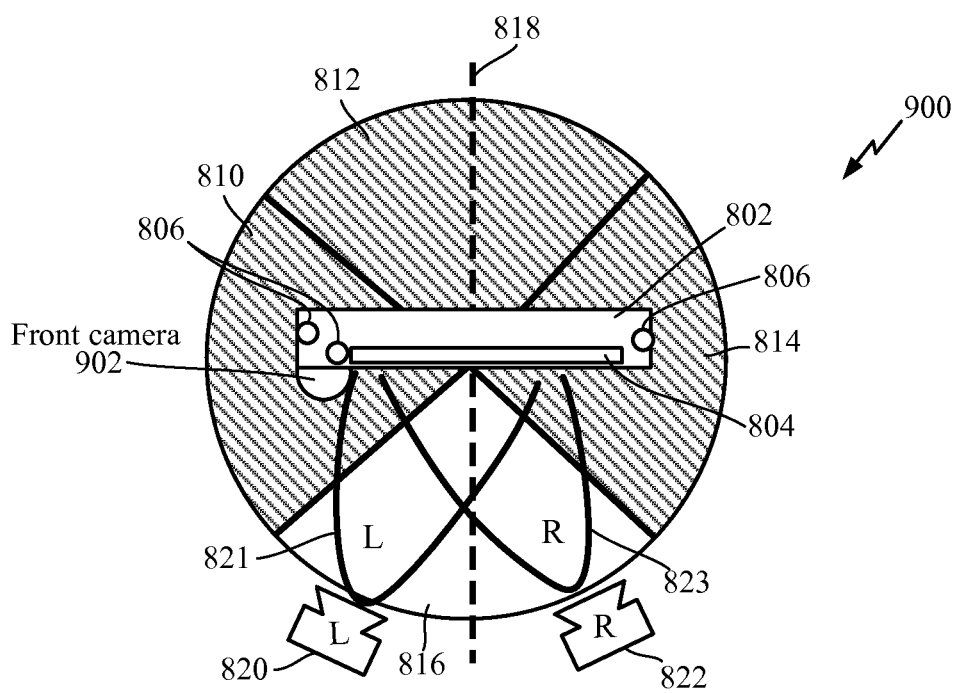
FIG. 9 is a conceptual diagram illustrating an example audio scene space around a handheld device where the audio region corresponding to a front camera of the handheld device is enabled.

As shown in FIG. 9, the device 802 can be switched by the user between the back camera 808 and a front camera 902. Thus, shaping of the audio is based on the operational mode of the capture device 802. Based on the back/front camera selection, the device 802 switches the focused audio region between the top region 812 and the bottom region 816. FIG. 9 is a conceptual diagram illustrating an example audio output space 900 around the device 802 where the audio region 816 corresponding to the front camera 902 of the handheld device 82 is enabled as a result of the front camera 902 being activated.

Both the front and back cameras 808, 902 may have a zoom feature. The device 802 can be configured so that the angular width of the top and bottom regions 812, 816 can depend on the camera zoom operations. For example, when the back camera 808 is activated, zooming-in may cause the angular width of enabled top region 812 to be reduced so that audio recording is more narrowly focused on the object of the zooming operation. Conversely, when the camera 808 is zoomed-out, the angular width of the enabled top region 812 may be increased. Alternatively/additionally, depending on the camera zoom operation, the additional gain may applied to the audio channels. By applying additional gain, as the zoom increases, the stereo audio becomes more like mono with centered image. The same audio zooming functions may likewise be included for the front camera 902.

Figure 10:
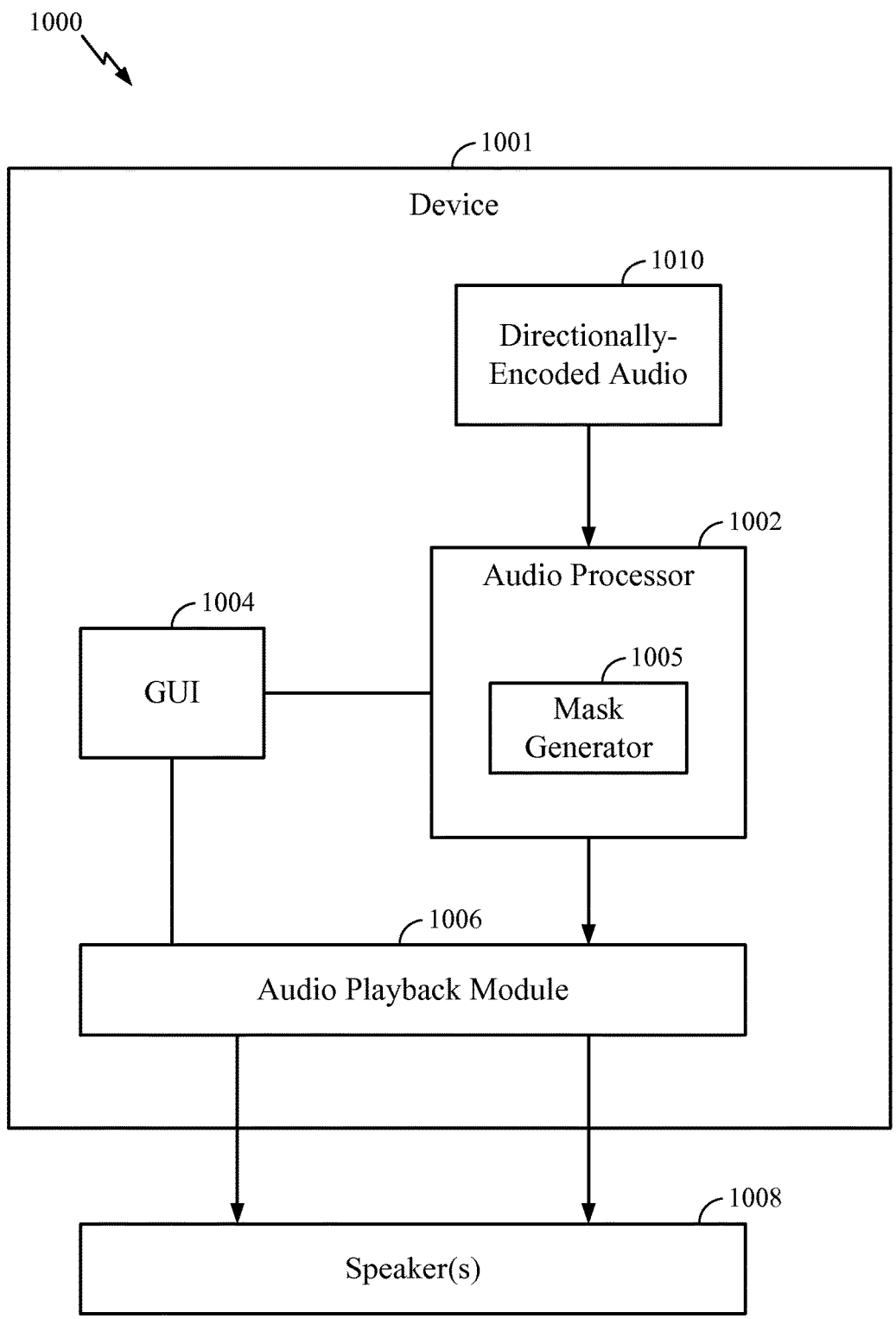
FIG. 10 is a block diagram of an exemplary system for shaping audio in accordance with the techniques disclosed herein.

FIG. 10 is a block diagram of an exemplary system 1000 for shaping audio output in accordance with the techniques disclosed herein. The system 1000 includes a device 1001 coupled to one or more audio speakers 1008. The device 1001 can be an audio capture device, an audio rendering device or a combination of both types of devices. For example, the device 1001 may be a set top box, theater sound system, car sound system, mobile device such as a cellular or smart phone, video camera, still camera, a combination of the two types of cameras or the like. The device 1001 includes an audio processor 1002 communicating with a GUI 1004 and an audio playback module 1006. The audio processor 1002 includes a mask generator 1005. The audio processor 1002 receives and processes directionally-encoded (spatial) audio data 1010 in accordance with the methods and techniques described above in connection with FIGS. 1-5. The mask generator 1005 may generate one or more masking windows functions and the audio outputs of such functions, according to the methods described herein.

The directionally-encoded audio 1010 may be generated by the device 1001 or provided by other recording devices or systems. The device may include memory (not shown) for storing the directionally-encoded audio 1010.

The GUI 1004 may be presented on a display (not shown) included in the device 1001. The GUI 1004 may permit users to perform functional and control operations as described herein, including entering data, such as sector boundaries, region boundaries, and enabled region selections, and well as control operation of the audio processor 1002 and playback module 1006. Thus, the GUI 1004 permits custom audio shaping using the methods described herein based on user inputs, e.g., gestures, pinches, touches, or the like. The GUI 1004 may also provide a user interface to control other device operations, such as camera operations, including those described in connection with FIGS. 8-9.

The playback module 1006 receives processed audio data from the audio processor 1002 and renders it into a form suitable for output by the speakers 1008. The module 1006 may include one or more audio D/A converters, filters, audio amplifiers and the like.

Figure 11:
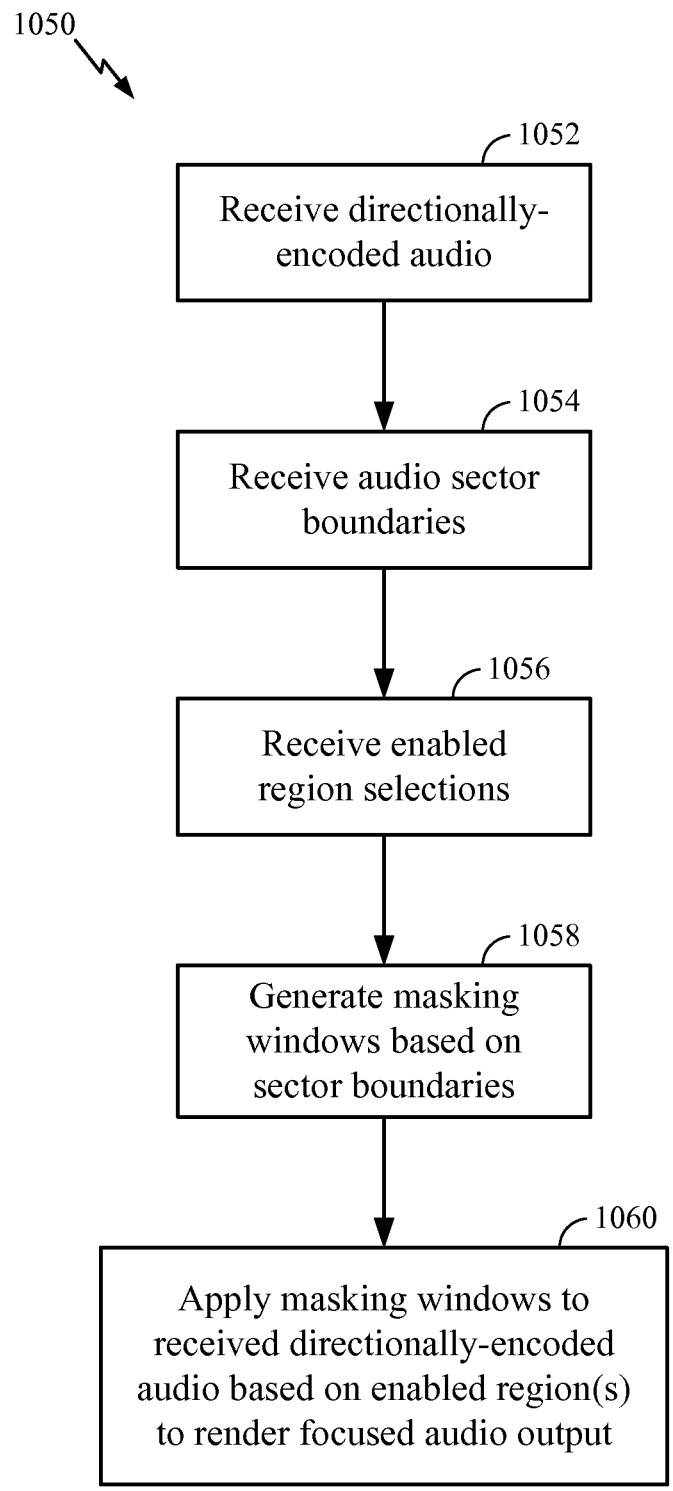
FIG. 11 is a flowchart illustrating a method of shaping audio in accordance with the techniques disclosed herein.

FIG. 11 is a flowchart illustrating a method 1050 of shaping digital audio data in accordance with the techniques disclosed herein. The method 1050 generally describes the operation of the audio processor 1002 shown in FIG. 10. In box 1052, directionally-encoded audio is received. The received audio data includes information for playing back the audio on a suitable sound reproduction system and information regarding the location of sound sources in the audio scene. The audio may be directionally encoded using the techniques described in connection with FIGS. 12-15. The directionally-encoded or spatial audio may include information identifying a DOA for each audio frame received.

In box 1054, audio sector boundaries are received. The audio sector boundaries may be input by a user through a GUI, such as GUI 1004. The sector boundaries may indicate an angular location on a unit circle, as illustrated, for example, in FIGS. 1-2.

In box 1056, one or more enabled region selections are received. The enabled region selection may be input by a user through a GUI, such as GUI 1004. The enabled regions may indicate an angular location on a unit circle, as described in connection with FIGS. 4-5. Alternatively, the enabled region selections may be based on the operational mode of the device, for example, as shown in FIGS. 8-9, where the enabled regions depended on whether the front or back camera of a device were enabled, or the zoom setting of a camera.

In box 1058, one or more masking window functions are generated based on sector boundaries, according to the methods described in connection with FIGS. 1-3.

In box 1060, the masking windows are applied to the received directionally-encoded audio based on the enabled regions, as described in connection with FIGS. 4-5, to generate focused or shaped audio output. The focused audio output data may then be rendered for playback through loudspeakers, headsets or any other suitable reproduction means.

Figure 12:
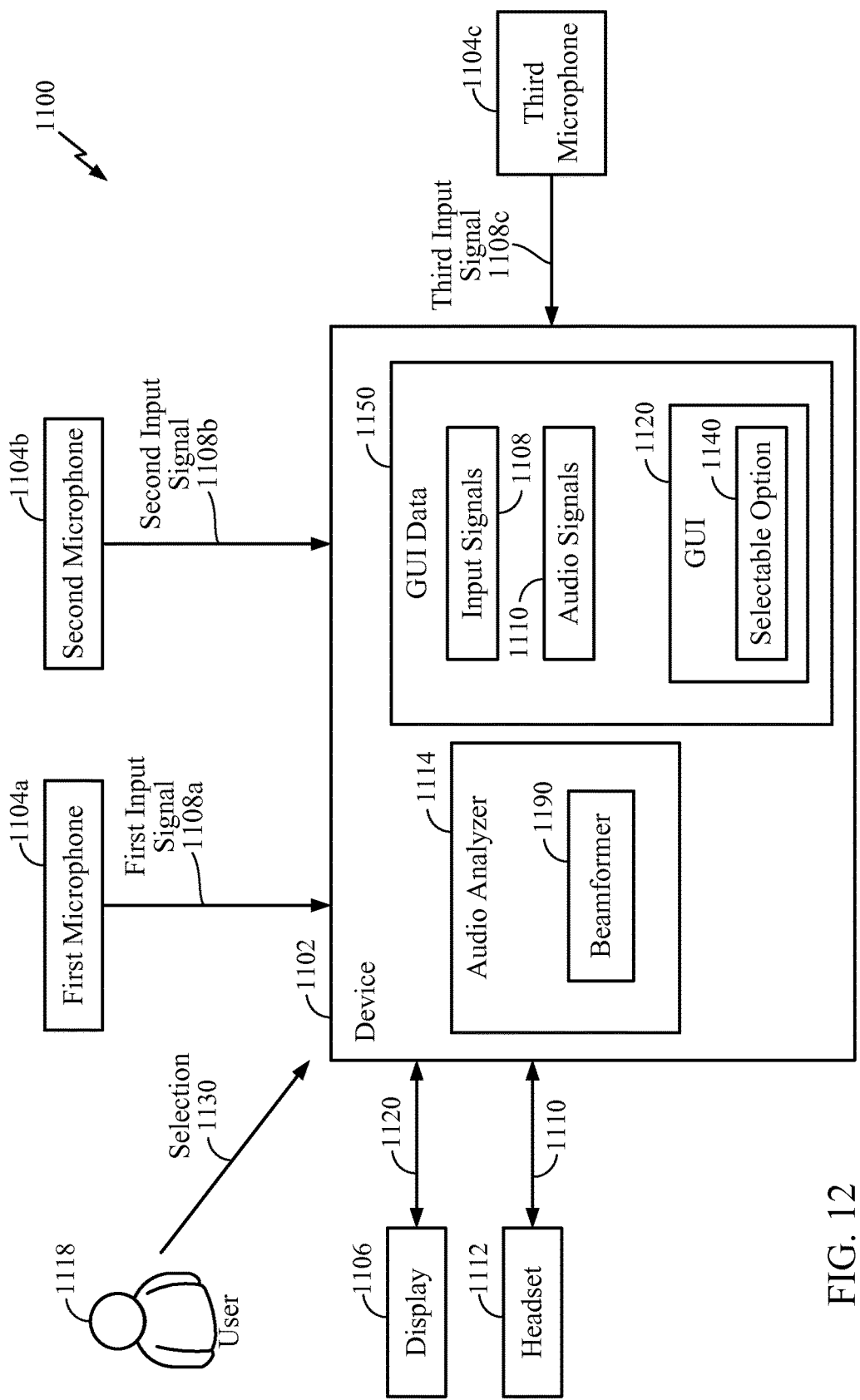
FIG. 12 is a diagram of an example system operable to perform multichannel audio generation and directionally encode received audio.

Referring to FIG. 12, a particular illustrative example of a system 1100 that is operable to perform multichannel audio generation and determine sound source directions of arrival (DOAs) is shown. The system 1100 may be used to produce the directionally-encoded audio data 1010. Thus, the system 1100 may be combined with or used in conjunction with device 1002, or any of the other devices 602, 802, 1604 described herein.

The system 1100 includes a device 1102. The device 1102 may include, or be coupled to, a plurality of microphones (e.g., a multi-microphone array). For example, the multi-microphone array may include a first microphone 1104*a*, a second microphone 1104*b*, and a third microphone 1104*c*. Although FIG. 12 illustrates three microphones, the device 1102 may be coupled to more than three microphones. The device 1102 outputs directionally-encoded or spatial audio data as audio signals 1110.

The multi-microphone array may be used with a spatially selective filter to produce a monophonic sound for each of one or more source directions. More importantly, the multi-microphone array may also be used to support spatial, directional audio encoding in two or three dimensions. Examples of spatial audio encoding methods that may be supported with a multi-microphone array as described herein include 5.1 surround, 7.1 surround, Dolby Surround, Dolby Pro-Logic, or any other phase-amplitude matrix stereo format; Dolby Digital, DTS or any discrete multichannel format; and wavefield synthesis. One example of a five-channel encoding includes Left, Right, Center, Left surround, and Right surround channels.

Although FIG. 12 illustrates the device 1102 coupled to three microphones, the device 1102 may be coupled to, or may include, more than three microphones. The device 1102 may include, or be coupled to, a display 1106, a headset, or both. The device 1102 may include an audio analyzer 1114 and GUI data 1150.

During operation, the audio analyzer 1114 may receive a first plurality of input signals (e.g., input signals 1108) from the microphones (e.g., the microphones 1104*a-c*). For example, the audio analyzer 1114 may receive a first input signal 1108*a* from the first microphone 1104*a*, may receive a second input signal 1108*b* from the second microphone 1104*b*, and may receive a third input signal 1108*c* from the third microphone 1104*c*. The input signals 1108 may correspond to one or more sound sources in an audio scene. For example, a user 118 may be at a beach holding the device 1102 (e.g., a mobile device). The input signals 1108 may correspond to sounds of waves, wind, traffic, people, dogs, etc.

The audio analyzer 1114 may generate a graphical user interface (GUI) 1120. For example, the user 118 may activate an audio generation application or audio processing application by selecting a particular icon displayed at the display 1106 or by speaking a voice command. The audio analyzer 1114 may, in response to receiving the selection of the particular icon or in response to receiving the voice command, generate the GUI 1120. The GUI 1120 may be interactive. For example, the GUI 1120 may include one or more selectable options (e.g., a selectable option 1140). The user 1118 may select at least one of the selectable options and the audio analyzer 1114 may generate the audio signals 1110 from the input signals 1108 based on the selection. For example, the selectable option 1140 may include a noise suppression option, may correspond to a particular channel icon, may include a delete option, may include a direction option, may include a particular gain option, may include a number of channels options, may include a headset option, or a combination thereof. The GUI 1120 may be combined with or operate in conjunction with the other GUIs disclosed herein, e.g., GUI 104 of FIG. 10.

The audio analyzer 1114 may provide the GUI 1120 to the display 1106. The user 1118 may select the selectable option 1140. For example, the audio analyzer 1114 may receive a selection 1130, via an input device (e.g., a mouse, a keyboard, a touchscreen, etc.), from the user 1118. In one configuration, the audio analyzer 1114 may provide the audio signals 1110 as directionally-encoded audio 1010 and/or to a headset. The user 1118 may use the headset to monitor the audio signals 1110. For example, the user 1118 may detect a stationary noise level of the audio signals 1110 and may select the selectable option 1140 corresponding to a noise suppression option to reduce the stationary noise level of subsequently generated audio signals 1110.

The audio analyzer 1114 may use techniques described in U.S. patent application Ser. No. 13/833,867, entitled "SYSTEMS AND METHODS FOR MAPPING A SOURCE LOCATION," filed Mar. 15, 2013 (hereinafter referred to as "the '867 patent application"), to determine direction of arrival information of the input signals 1108 and to generate an anglogram representation of the input signals 1108.

For example, a method of generating a directionally-encoded multichannel signal (e.g., the audio signals 1110), such as performed by the audio analyzer 1114, may include calculating, for each of a plurality of different frequency components of a received multichannel input signal (e.g., the input signals 1108), a difference between a phase of the frequency component in each of a first pair of channels (e.g., the first input signal 1108*a* and the second input signal 1108*b*) of the received multichannel signal, to obtain a plurality of phase differences. The method may also include estimating an error, for each of a plurality of candidate directions, between the candidate direction and a vector that is based on the plurality of phase differences. The plurality of phase differences may indicate observed phase differences. The audio analyzer 1114 may determine candidate phase differences corresponding to the candidate direction. The estimated error may indicate a difference between the observed phase differences and the candidate phase differences. This method may also include selecting, from among the plurality of candidate directions, a candidate direction that corresponds to the minimum among the estimated errors. In this method, each of said first pair of channels is based on a signal (e.g., the first input signal 1108*a*, the second input signal 1108*b*, or the third input signal 1108*c*) produced by a corresponding one of a first pair of microphones (e.g., the microphones 1104*a* and 1104*c*), and at least one of the different frequency components has a wavelength that is less than twice the distance between the microphones of the first pair.

It may be assumed that in near-field and far-field regions of an emitted sound field, wavefronts of the emitted sound field are spherical and planar, respectively. The near-field may be defined as a region of space that is less than one wavelength away from a sound receiver (e.g., a microphone array including the microphones 1104*a-c*). Under this definition, a distance to a boundary of the region varies inversely with frequency. At frequencies of two hundred, seven hundred, and two thousand hertz, for example, a distance to a one-wavelength boundary is about 170, forty-nine, and seventeen centimeters, respectively. It may be useful to consider the near-field/far-field boundary to be at a particular distance from the microphone array (e.g., fifty centimeters from a microphone of the array or from the centroid of the array, or one meter or 1.5 meters from a microphone of the array or from the centroid of the array).

In addition to determining the DOA of incoming audio, the audio analyzer 1114 may perform further processing of the input signals 1108 to generate the audio signals 1110. For example, the audio analyzer 1114 may use techniques described in reference to at least FIGS. 10-17 of U.S. patent application Ser. No. 13/664,687, entitled "THREE-DIMENSIONAL SOUND COMPRESSION AND OVER-THE-AIR TRANSMISSION DURING A CALL," filed on Oct. 31, 2012 (hereinafter referred to as "the '687 patent application") to process the input signals 1108. In this case, the audio analyzer 1114 may generate several different directional channels (e.g., the audio signals 1110) from the input signals 1108, such as to upmix the input signals 1108. For example, the input signals 1108 may correspond to a first number of channels associated with the first number (e.g., three) microphones (e.g., the microphones 1104*a-c*). The audio signals 1110 may correspond to a second number of channels and the second number may be higher than the first number. For example, the audio signals 1110 may correspond to five channels for a 5.1 surround sound scheme. The audio analyzer 1114 may upmix the input signals 1108 to generate the audio signals 110, such that each signal (or channel) of the audio signals 1110 may be played back using a different speaker of a speaker array having the second number of speakers. The audio analyzer 1114 may apply spatial filtering (e.g., one or more beamformers) in corresponding directions to obtain the upmixed channels (e.g., the audio signals 1110). The audio analyzer 1114 may apply a multichannel encoding scheme to the upmixed channels (e.g., a version of Dolby Surround).

Also, the audio analyzer 1114 may additionally process the input signals 1108 by applying spatial filtering in corresponding directions to obtain downmixed channels (e.g., the audio signals 1110). For example, the input signals 1108 may correspond to a third number of microphones and the third number may be greater than the second number.

In some configurations, the audio analyzer 1114 may also generate each particular audio signal (or channel) of the audio signals 1110 by applying a beamformer 1190 to the input signals 1108. The beamformer 1190 may corresponds to a particular direction associated with the particular audio signal (or channel). For example, the audio analyzer 1114 may apply a first beamformer (e.g., the beamformer 1190) to the input signals 1108 corresponding to a first direction (e.g., center) to generate a first audio signal (e.g., a center channel) of the audio signals 1110, may apply a second beamformer (e.g., the beamformer 1190) to the input signals 1108 corresponding to a second direction (e.g., right) to generate a second audio signal (e.g., a right channel) of the audio signals 1110, and so on.

The audio analyzer 1114 may produce filtered signals by filtering the input signals 1108 based on receiving the selection 1130. In this example, the audio analyzer 1114 may process (e.g., upmix or downmix) the filtered signals to generate the audio signals 1110.

The GUI data 1150 may include the GUI 1120, the input signals 1108, the audio signals 1110, or a combination thereof. The audio analyzer 1114 may store the GUI data 1150 in a memory coupled to, or included in, the device 1102. The audio signals 1110 may be compressed and may occupy less memory than the input signals 1108. For example, if the user 118 expects to playback captured audio via a particular number of speakers, the user 1118 may generate the audio signals 1110 corresponding to the particular number of speakers (or channels) based on the number of channels options, may include the audio signals 1110 in the GUI data 1150 stored in the memory, and may not store (e.g., delete or mark for deletion memory corresponding to) the input signals 1108 in the memory to conserve memory usage.

The system 1100 may thus enable a user to select a particular selectable option of a graphical user interface to interactively generate a multichannel audio signal from input signals received via a plurality of microphones. The user may receive feedback regarding the generated audio signals. For example, the user may hear the audio signals via a headset or loudspeakers, or may receive feedback via the GUI. The user may, based on the feedback, choose a selectable option of the GUI to change how the audio signals are generated. As a result, the user experience and quality of the generated audio signals may be improved.

Figure 13:
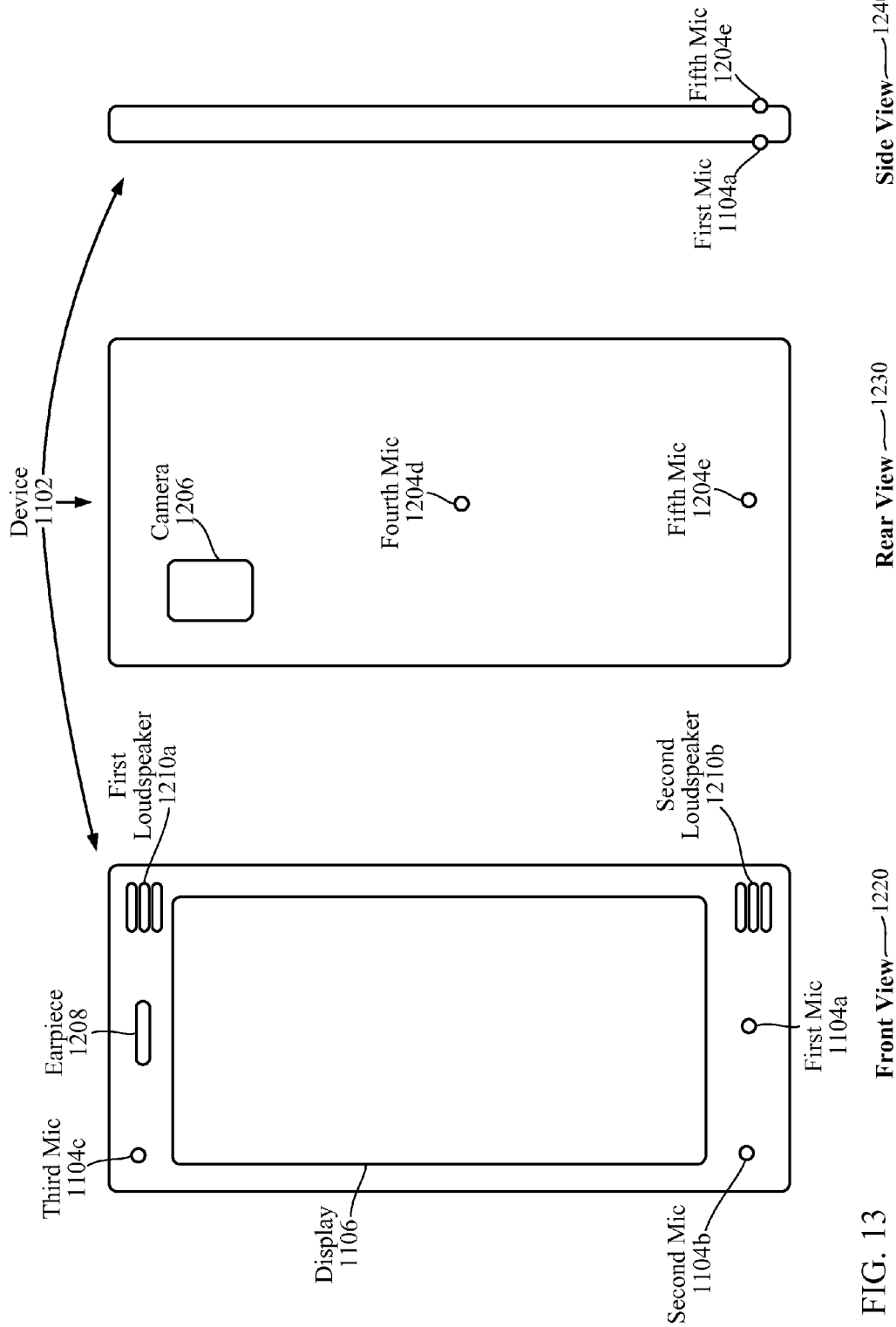
FIG. 13 is a diagram of multiple views of an example of a device operable to implement the system of FIG. 12.

Referring to FIG. 13, multiple views of the device 1102 are shown. The views include a front view 1220, a rear view 1230, and a side view 1240. The front view 1220 may correspond to a first side of the device 1102 that includes the display 1106. The first side may include the first microphone 1104a, the second microphone 1104b, the third microphone 1104c, an earpiece 1208, a first loudspeaker 1210a, and a second loudspeaker 1210b.

The rear view 1230 may correspond to a second side of the device 1102 that is opposite to the first side. The second side may include a camera 1206, a fourth microphone 1204d, and a fifth microphone 1204e. The side view 1240 may correspond to a third side of the device 1102 that connects the first side and the second side.

The device 1102 (or the audio analyzer 1114 of FIG. 12) may be configured to determine a direction of arrival (DOA) of a source signal by measuring a difference (e.g., a phase difference) between microphone channels (e.g., the first input signal 1108a and the second input signal 1108b) for each frequency bin to obtain an indication (or estimation) of direction, and averaging the direction indications over all frequency bins to determine whether the estimated direction is consistent over all bins. The range of frequency bins that may be available for tracking may be constrained by a spatial aliasing frequency for a corresponding microphone pair (e.g., the first microphone 1104a and the second microphone 1104b). The upper limit of the range may be defined as a frequency at which a wavelength of the source signal is twice the distance, d, between the microphones 1104a-b.

As discussed above, the audio analyzer 1114 may use techniques described in the '867 patent application to determine direction of arrival information of the input signals 1108 corresponding to the microphones 1104a-c and the to the microphones 1204d-e and to generate an anglogram representation of the input signals 1108.

For example, robustness in estimating a three-dimensional direction of arrival (DOA) for each frame of an audio signal for concurrent multiple sound events may be obtained by increasing a number of reliable frequency bins. A pairwise one dimensional (1-D) approach as described herein may be appropriately incorporated into any microphone geometry.

The audio analyzer 1114 may track sources of sound using available frequency bins up to Nyquist frequency and down to a lower frequency (e.g., by supporting use of a microphone pair having a larger inter-microphone distance). Rather than being limited to a single pair for tracking, such an approach may be implemented to select a best pair among all available pairs. Such an approach may be used to support source tracking even in a far-field scenario, up to a distance of three to five meters or more, and to provide a much higher DOA resolution. Other potential features include obtaining an exact 2-D representation of an active source.

The audio analyzer 1114 may calculate a difference between a pair of channels of a multichannel input signal (e.g., the input signals 1108). For example, each channel of the multichannel signal may be based on a signal (e.g., a first input signal of the input signals 1108) produced by a corresponding microphone (e.g., one of the microphones 1104a-c, 1204d-e). For each among a plurality K of candidate directions, the audio analyzer 1114 may calculate a corresponding directional error that is based on the calculated difference. Based on the K directional errors, the audio analyzer 1114 may select a candidate direction.

The audio analyzer 1114 may process the multichannel input signal (e.g., the input signals 1108) as a series of segments or "frames." A segment length may range from about five or ten milliseconds to about forty or fifty milliseconds, and the segments may be overlapping (e.g., with adjacent segments overlapping by 25% or 50%) or non-overlapping. In one particular example, the multichannel signal (e.g., the input signals 1108) is divided into a series of non-overlapping segments or frames, each having a length of ten milliseconds. In another particular example, each frame has a length of twenty milliseconds. A segment as processed by the audio analyzer 1114 may also be a segment (i.e., a "subframe") of a larger segment as processed by a different operation, or vice versa.

Examples of differences between the input channels (e.g., the first input signal 1108a and the second input signal 1108b) include a gain difference or ratio, a time difference of arrival, and a phase difference. For example, the audio analyzer 1114 may calculate the difference between the channels of a pair of input signals (e.g., the first input signal 1108a and the second input signal 1108b) as a difference or ratio between corresponding gain values of the channels (e.g., a difference in magnitude or energy).

The audio analyzer 1114 may calculate measures of a gain of a segment of the multichannel signal (e.g., the input signals 1108) in a time domain (e.g., for each of a plurality of subbands of the signal) or in a frequency domain (e.g., for each of a plurality of frequency components of the signal in a transform domain, such as a fast Fourier transform (FFT), discrete cosine transform (DCT), or modified DCT (MDCT) domain). Examples of such gain measures include, without limitation, the following: total magnitude (e.g., sum of absolute values of sample values), average magnitude (e.g., per sample), root mean square (RMS) amplitude, median magnitude, peak magnitude, peak energy, total energy (e.g., sum of squares of sample values), and average energy (e.g., per sample).

In order to obtain accurate results with a gain-difference technique, the responses of the two microphone channels (e.g., the first input signal 1108a and the second input signal 1108b) may be calibrated relative to each other. The audio analyzer 1114 may apply a low-pass filter to the multichannel signal (e.g., the input signals 1108) such that calculation of the gain measure is limited to an audio-frequency component of the multichannel signal (e.g., the input signals 1108).

The audio analyzer 1114 may calculate a difference between gains as a difference between corresponding gain measure values for each channel of the multichannel signal (e.g., the input signals 1108) in a logarithmic domain (e.g., values in decibels) or, equivalently, as a ratio between the gain measure values in a linear domain. For a calibrated microphone pair (e.g., the microphones 1104a-b), a gain difference of zero may be taken to indicate that the source is equidistant from each microphone (i.e., located in a broadside direction of the pair), a gain difference with a large positive value may be taken to indicate that the source is closer to one microphone (i.e., located in one endfire direction of the pair), and a gain difference with a large negative value may be taken to indicate that the source is closer to the other microphone (i.e., located in the other endfire direction of the pair).

In another example, the audio analyzer 1114 may perform a cross-correlation on the input channels (e.g., the first input signal 1108a and the second input signal 1108b) to determine the difference, such as by calculating a time-difference-of-arrival based on a lag between channels of the multichannel signal (e.g., the input signals 1108).

In a further example, the audio analyzer 1114 may calculate the difference between the channels of a pair (e.g., the first input signal 1108a and the second input signal 1108b) as a difference between the phase of each channel (e.g., at a particular frequency component of the signal). As described herein, such calculation may be performed for each among a plurality of frequency components.

For a signal received by a pair of microphones (e.g., the microphones 1104a-b) directly from a point source in a particular direction of arrival (DOA) relative to an axis of the microphone pair (e.g., the microphones 1104a-b), a phase delay may differ for each frequency component and may also depend on a spacing between the microphones 1104a-b. The audio analyzer 1114 may calculate an observed value of the phase delay at a particular frequency component (or "bin") as an inverse tangent (also called the arctangent) of a ratio of an imaginary term of a complex FFT coefficient to a real term of the complex FFT coefficient.

Figure 14B:
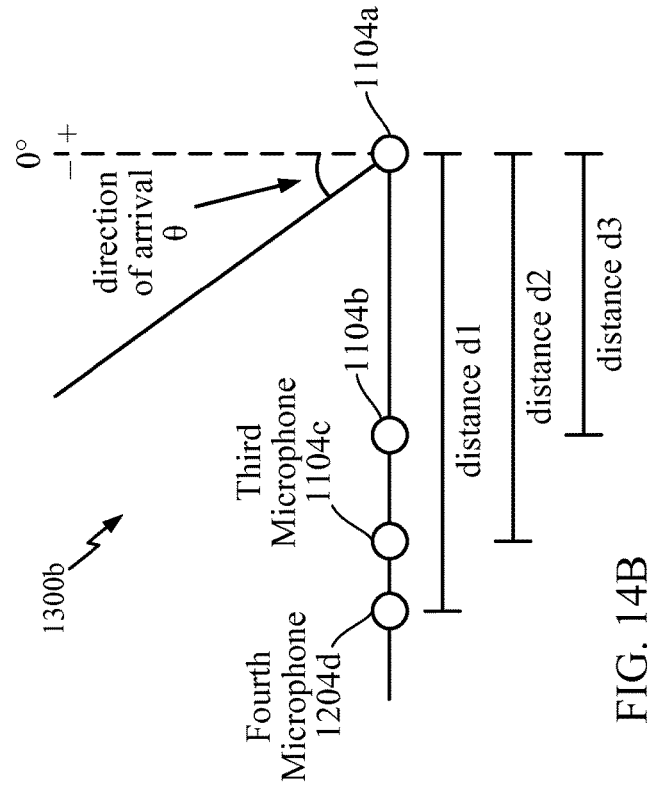
FIG. 14B is a diagram of an example microphone placement that may correspond to microphones of the system of FIG. 12.
Figure 14A:
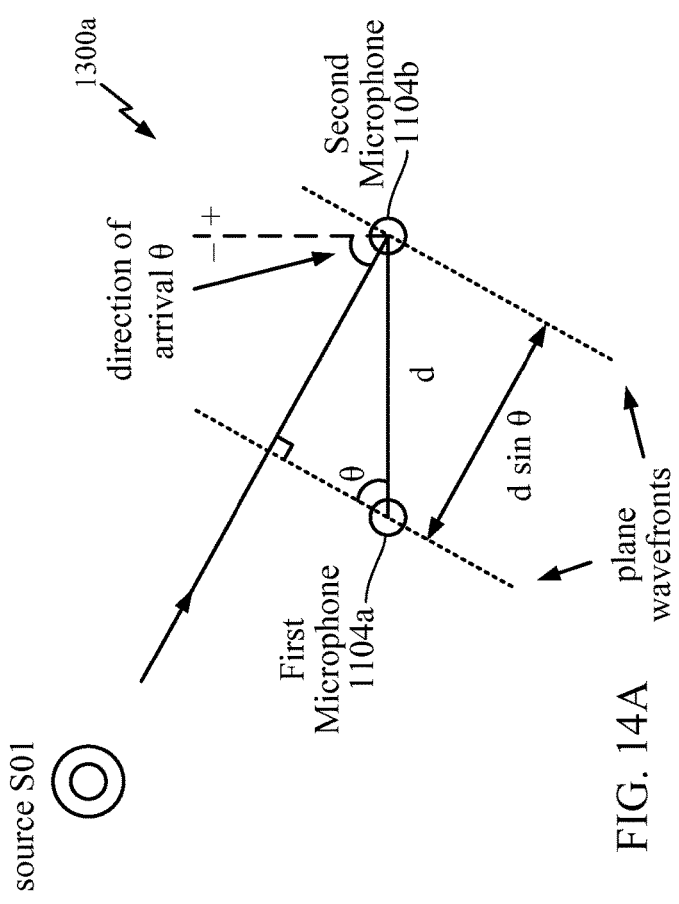
FIG. 14A is a diagram of an example far-field model of plane wave propagation relative to a microphone pair of the system of FIG. 12.

Referring to FIG. 14A, a diagram of a far-field model of plane wave propagation is shown and generally designated 1300a. In FIG. 14B, a diagram of an example of a microphone placement is shown and generally designated 1300b.

The microphone placement 1300b may correspond to placement of the microphones 1104a-c of FIG. 12 and the fourth microphone 1204d of FIG. 13.

The audio analyzer 1114 may use the techniques disclosed in the '867 patent application to determine direction of arrival information of the input signals 1108 corresponding to the microphones 1104a-c and 1204d and to generate an anglogram representation of the input signals 1108.

For example, the far-field model 1300a illustrates a phase delay value $\Delta\varphi_f$ for a source S01 for at least one microphone (e.g., the microphones 1104a-b) at a particular frequency, f, may be related to source DOA under a far-field (i.e., plane-wave) assumption as $$\Delta\varphi_f = 2\pi f \frac{d\sin\theta}{c},$$

where d denotes a distance between the microphones 1104a-b (in meters), θ denotes the angle of arrival (in radians) relative to a direction that is orthogonal to an array axis, f denotes frequency (in hertz (Hz)), and c denotes the speed of sound (in m/s). The DOA estimation principles described herein may be extended to multiple microphone pairs in a linear array (e.g., as shown in FIG. 14B). For the case of a single point source with no reverberation, a ratio of phase delay to frequency $\Delta\varphi_f$ will have the same value $$2\pi f \frac{d\sin\theta}{c}$$

over all frequencies. The DOA, θ, relative to a microphone pair (e.g., the microphones 1104a-b) is a one-dimensional measurement that defines a surface of a cone in space (e.g., such that an axis of the cone is the axis of the array).

A speech signal may be sparse in a time-frequency domain. If sources of the input signals 1108 are disjoint in the frequency domain, then the audio analyzer 1114 may track two sources at the same time. If the sources are disjoint in the time domain, then the audio analyzer 1114 may track two sources at the same frequency. A microphone array of the device 1102 may include a number of microphones that is at least equal to a number of different source directions to be distinguished at any one time. The microphones (e.g., the microphones 1104a-c of FIG. 12 and the microphones 1204d-e) may be omnidirectional (e.g., for a cellular telephone or a dedicated conferencing device) or directional (e.g., for a device such as a set-top box).

The audio analyzer 1114 may calculate a DOA estimate for a frame of a received multichannel input signal (e.g., the input signals 1108). The audio analyzer 1114 may calculate, at each frequency bin, an error for each candidate angle with respect to an observed angle, which is indicated by a phase delay. A target angle at that frequency bin may be the candidate having a minimum (or least) error. In one example, the error may be summed across the frequency bins to obtain a measure of likelihood for the candidate. In another example, one or more of the most frequently occurring target DOA candidates across all frequency bins may be identified as the DOA estimate (or estimates) for a given frame.

The audio analyzer 1114 may obtain substantially instantaneous tracking results (e.g., with a delay of less than one frame). The delay may be dependent on a FFT size and a degree of overlap. For example, for a 512-point FFT with a 50% overlap and a sampling frequency of 16 kilohertz (kHz), a resulting 256-sample delay may correspond to sixteen milliseconds. The audio analyzer 1114 may support differentiation of source directions up to a source-array distance of two to three meters, or even up to five meters.

The error may also be considered as a variance (i.e., the degree to which the individual errors deviate from an expected value). Conversion of the time-domain received signal into the frequency domain (e.g., by applying an FFT) has an effect of averaging a spectrum in each bin. This averaging may be even more effective if the audio analyzer 1114 uses a subband representation (e.g., mel scale or Bark scale). Additionally, the audio analyzer 1114 may perform time-domain smoothing on the DOA estimates (e.g., by applying a recursive smoother, such as a first-order infinite-impulse-response filter). The audio analyzer 1114 may reduce a computational complexity of the error calculation operation (e.g., by using a search strategy, such as a binary tree, and/or applying known information, such as DOA candidate selections from one or more previous frames).

Even though directional information may be measured in terms of phase delay, the audio analyzer 1114 may obtain a result that indicates source DOA. Consequently, the audio analyzer 1114 may calculate a directional error at frequency f, for each of an inventory of K DOA candidates, in terms of DOA rather than in terms of phase delay.

Figure 15:
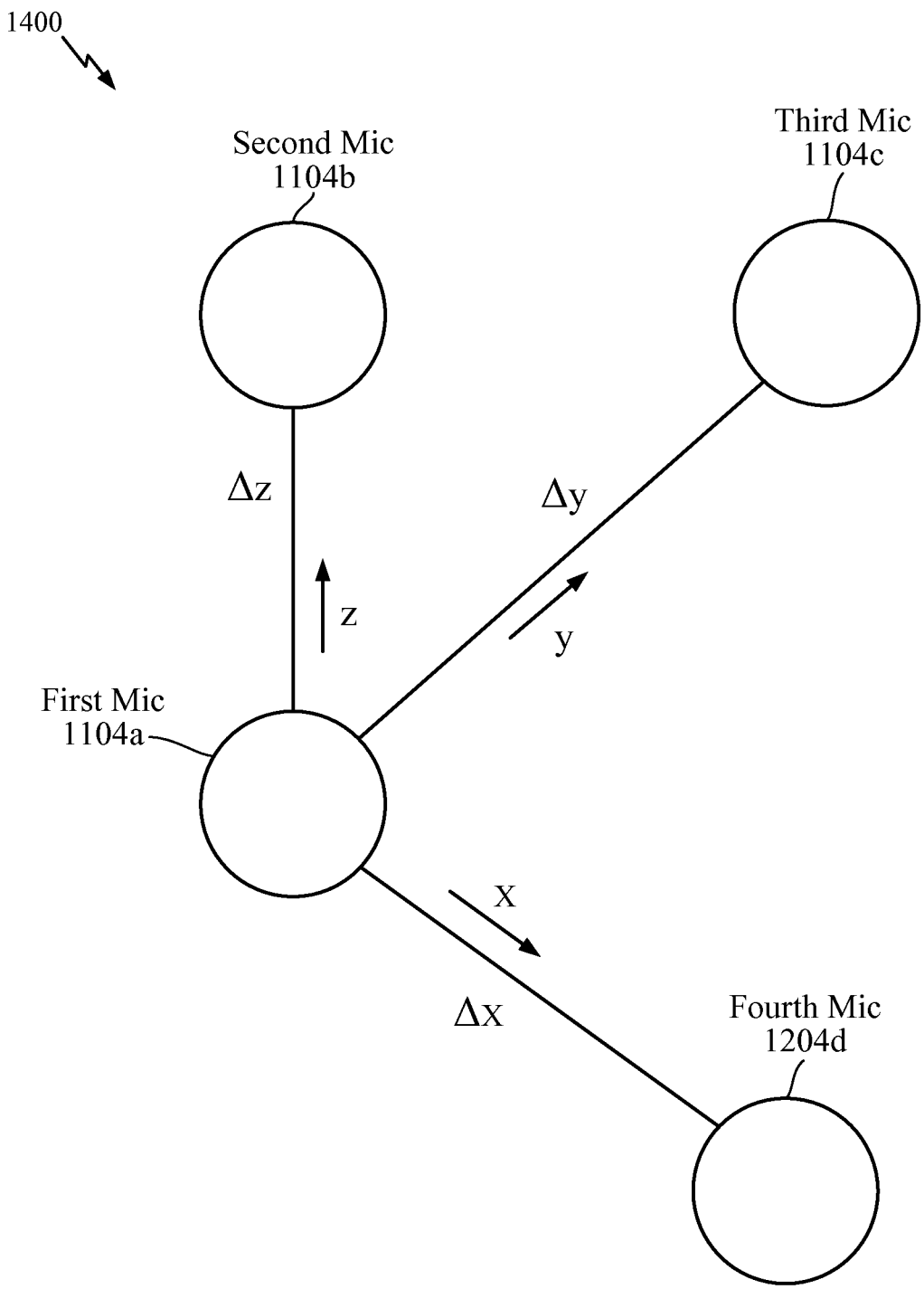
FIG. 15 is a diagram of an alternative exemplary arrangement of microphones that may be included in the system of FIG. 12.

Referring to FIG. 15, a particular alternative arrangement of microphones is shown and generally designated 1400. The arrangement 1400 may correspond to microphones of the system 1100 of FIG. 12. With this microphone arrangement 1400, the audio analyzer 1114 may use techniques described in the '687 patent application to generate the audio signals 1110 from the input signals 1108 corresponding to the microphones 1104*a-c* and 1204*d*.

For example, the audio analyzer 1114 of FIG. 12 may use the arrangement 1400 for approximating a first order capturing for spatial coding using a four-microphone (e.g., the microphones 1104*a-c* and the microphone 1204*d*) setup. Examples of spatial audio encoding methods that may be supported with a multi-microphone array as described herein may also include methods that may originally be intended for use with a particular microphone, such as the Ambisonic B format or a higher-order Ambisonic format. The processed multichannel outputs of an Ambisonic encoding scheme, for example, may include a three-dimensional Taylor expansion on a measuring point, which can be approximated at least up to first-order using a three-dimensionally located microphone array, e.g., corresponding to the arrangement 1400. With more microphones, an approximation order may be increase. According to an example, the second microphone 1104*b* may be separated from a first microphone 1104*a* by a distance $\Delta z$ in the z direction. A third microphone 1104*c* may be separated from the first microphone 1104*a* a distance $\Delta y$ in the y direction. A fourth microphone 1204*d* may be separated from the first microphone 1104*a* a distance $\Delta x$ in the x direction.

In summary, the audio signals captured using the microphones 1104*a-c* and/or 1204*d-e* may be processed or/and filtered based on the user selection 1130, as described with reference to FIGS. 12-15, to obtain DOAs of audio frames, and then also "shaped" according to the techniques described with reference to FIGS. 1-11. The shaped audio signals may be played back in a surround sound system, headphones, or other setup to generate an immersive sound experience.

Figure 16:
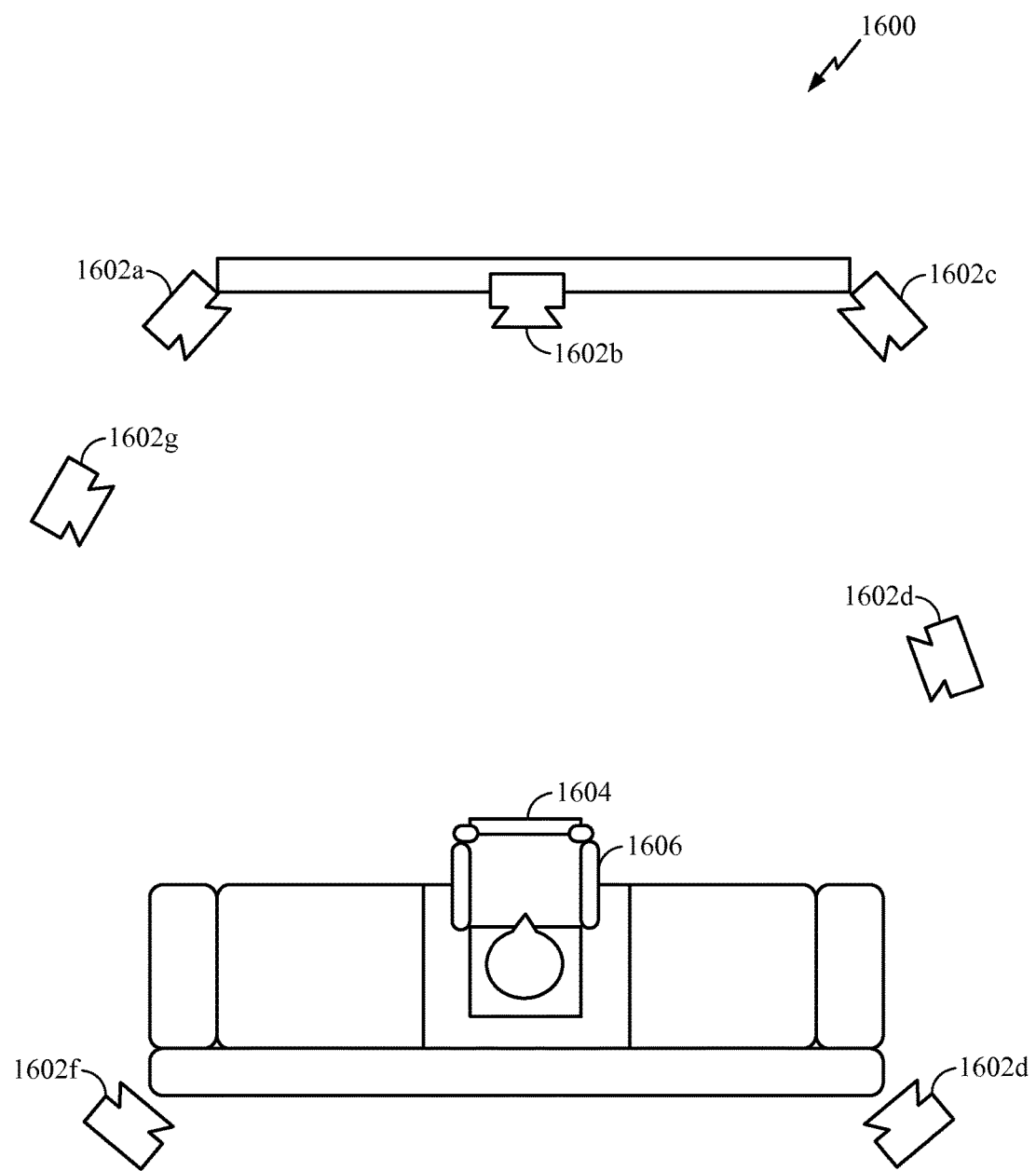
FIG. 16 is a conceptual diagram illustrating a technique for calibrating the actual locations of loudspeakers of a playback system so that audio data can be shaped according to the techniques described herein to account for the actual speaker locations.

FIG. 16 is a conceptual diagram illustrating a technique for calibrating a sound reproduction system with the actual locations of loudspeakers 1602*a-g* in a playback system so that audio can be shaped according to the techniques described herein to account for the actual speaker locations. The system shown in the scene 1600 is a surround sound 7.1 system. Other systems having a different number of loudspeakers may be calibrated using the following method.

The calibration method for making transparent spatial reproduction between the record site and the listening space 1600 proceeds as follows:

1. A left channel calibration signal is sent through the left channel speaker 1602*a*. The calibration signal may be a predefined tone.
2. The DOA of left loudspeaker 1602*a* is obtained by user device 1604 held by user 1606, and a signal delay is recorded by the device 1604 to estimate the distance between the device 1604 and speaker 1602*a*. The device 1102 and techniques described in connection with FIGS. 12-15 can be included in device 1604 so that the DOA of the loudspeaker 1602*a* can be determined
3. Steps 1-2 are repeated for other channels 1602*b-g*.
4. The DOA and distance information for each loudspeaker 1602*a-g* is passed to a surround sound recording (SSR) system. For example, the loudspeaker distance and DOA (location) information may be provided to any of devices 602, 802, 1001, 1102, any of which may be included in device 1604.
5. When a user processes, stores, or plays a recorded audio clip with, for example device 1604, it may be processed in real-time with such loudspeaker location information. The real-time processing can be done in the audio reproduction stage or at the recordation stage.

Note that with this procedure, the sound system may reproduce an auditory scene in terms of directionality that has much higher directional fidelity to the actual sound scene recorded by the user with the same device.

In conventional systems, calibration only aims to compensate loudspeaker position mismatch and it introduces unavoidable non-linear mapping distortion between actual source location and compensated source location. Unlike conventional sound systems, the system 1600 and techniques described herein resolve this issue in a reciprocal manner, and thus, there is no non-linear source location mapping mismatch. This improves transparency between the recorded audio scene and reproduced audio scene.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or component for purposes of clarity, it should be understood that the techniques of this disclosure may be performed by any suitable combination of components or modules associated with a sound system.

In one or more examples, the functions described may be implemented in hardware, software, firmware, or any suitable combination thereof. If implemented in software, the functions may be stored as one or more instructions or code on a computer-readable medium and executed by a hardware-based processing unit. Computer-readable media may include any computer-readable storage media, including data storage media, which may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disc storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

Instructions or code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits, including logic circuits and/or logic elements.

The techniques of this disclosure may be implemented in a wide variety of devices or apparatuses, including a wireless handset, personal computer, set top box, conferencing system, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various techniques have been described. These and other techniques are within the scope of the following claims.

What is claimed is:

1. A method of processing audio, comprising:
   receiving, at a device, audio data corresponding to a scene;
   receiving a selection distinguishing one or more enabled regions and one or more disabled regions in the scene;
   determining, based on the audio data, spatial information indicative of one or more directions of one or more sound sources in the scene; and
   modifying the audio data based on the selection, based on the spatial information, and based on input data identifying one or more spatial characteristics of a playback environment, wherein the modifying includes applying one or more gains based on a masking window function.

2. The method of claim 1, wherein the one or more gains include a cumulative gain for a particular audio channel, and further comprising:
   determining the cumulative gain for the particular audio channel, wherein the cumulative gain is based on a sum of gains associated with enabled regions corresponding to the particular audio channel, wherein modifying the audio data includes applying the cumulative gain to a portion of the audio data corresponding to the particular audio channel.

3. The method of claim 1, wherein the selection is based on an operational mode of the device.

4. The method of claim 3, wherein the operational mode of the device is selected from the group consisting of front camera enabled and back camera enabled.

5. The method of claim 1, wherein the device includes a camera and the selection is based on a zoom operation of the camera.

6. The method of claim 1, further comprising:
   providing a user interface configured to permit a user to select the one or more enabled regions in the scene, wherein the selection is received via the user interface.

7. The method of claim 1, further comprising:
   receiving the input data through a user interface that permits a user to configure the input data according to the one or more spatial characteristics of the playback environment.

8. The method of claim 1, wherein the input data includes a sector definition indicating a region in the playback environment.

9. The method of claim 8, wherein the sector definition corresponds to a loudspeaker location in the playback environment.

10. The method of claim 8, wherein the masking window function is based on the selection and the sector definition.

11. The method of claim 1, wherein the input data identifies a plurality of regions in the playback environment, and further comprising mapping a single region of the enabled regions to multiple regions of the plurality of regions, wherein modifying the audio data based on the selection and based on the input includes modifying the audio data based at least in part on the mapping.

12. An apparatus, comprising:
   an interface configured to receive audio data corresponding to a scene; and
   a processor configured to:
      determine, based on the audio data, spatial information indicative of one or more directions of one or more sound sources in the scene; and
      modify the audio data based on a selection distinguishing one or more enabled regions and one or more disabled regions in the scene, based on the spatial information, and based on input data identifying one or more spatial characteristics of a playback environment, wherein the processor is configured to modify the audio data at least in part by applying one or more gains based on a masking window function.

13. The apparatus of claim 12, further comprising a second interface configured to receive the selection.

14. The apparatus of claim 12, wherein the selection is based on an operational mode of the apparatus.

15. The apparatus of claim 12, further comprising a camera, wherein the selection is based on a zoom operation of the camera.

16. The apparatus of claim 12, further comprising a user interface configured to permit a user to select the one or more enabled regions in the scene to provide the selection.

17. The apparatus of claim 12, further comprising:
   a user interface to permit a user to configure the input data according to the one or more spatial characteristics of the playback environment.

18. The apparatus of claim 12, wherein the input data includes a sector definition indicating a region in the playback environment, and wherein the sector definition corresponds to a loudspeaker location in the playback environment.

19. The apparatus of claim 18, wherein the masking window function is based on the selection and the sector definition.

20. The apparatus of claim 12, further comprising:
a module configured to render the modified audio data for playback.

21. An apparatus, comprising:
means for receiving audio data corresponding to a scene;
means for receiving a selection distinguishing one or more enabled regions and one or more disabled regions in the scene;
means for determining, based on the audio data, spatial information indicative of one or more directions of one or more sound sources in the scene; and
means for modifying the audio data based on the selection, based on the spatial information, and based on input data identifying one or more spatial characteristics of a playback environment, wherein the means for modifying is configured to modify the audio data at least in part by applying one or more gains based on a masking window function.

22. The apparatus of claim 21, wherein the one or more gains include a cumulative gain for a particular audio channel, and further comprising:
means for determining the cumulative gain for the particular audio channel, wherein the cumulative gain is based on a sum of gains associated with enabled regions corresponding to the particular audio channel, wherein the means for modifying the audio data is configured to apply the cumulative gain to a portion of the audio data corresponding to the particular audio channel.

23. The apparatus of claim 21, wherein the selection is based on an operational mode of the apparatus.

24. The apparatus of claim 21, further comprising a camera, wherein the selection is based on a zoom operation of the camera.

25. The apparatus of claim 21, wherein the means for receiving a selection includes means for providing a user interface configured to permit a user to select the one or more enabled regions in the scene.

26. The apparatus of claim 21, further comprising:
means for receiving the input data through a user interface that permits a user to configure the input data according to the one or more spatial characteristics of the playback environment.

27. The apparatus of claim 21, wherein the input data includes a sector definition indicating a region in the playback environment.

28. The apparatus of claim 27, wherein the sector definition corresponds to a loudspeaker location in the playback environment.

29. The apparatus of claim 27, wherein the masking window function is based on the selection and the sector definition.

30. A non-transient computer-readable medium embodying a set of instructions executable by one or more processors, comprising:
code for receiving audio data corresponding to a scene;
code for receiving a selection distinguishing one or more enabled regions and one or more disabled regions in the scene;
code for determining, based on the audio data, spatial information indicative of one or more directions of one or more sound sources in the scene; and
code for modifying the audio data based on the selection, based on the spatial information, and based on input data identifying one or more spatial characteristics of a playback environment, wherein the modifying includes applying one or more gains based on a masking window function.

* * * * *